(12) United States Patent
Low

(10) Patent No.: US 8,911,641 B2
(45) Date of Patent: *Dec. 16, 2014

(54) HEAT TRANSFER COMPOSITIONS

(71) Applicant: Mexichem Amanco Holding S.A. de C.V., Tlalnepantla (MX)

(72) Inventor: Robert E. Low, Cheshire (GB)

(73) Assignee: Mexichem Amanco Holding S.A. de C.V., Tlalnepantla (MX)

( * ) Notice: Subject to any disclaimer, the term of this patent is extended or adjusted under 35 U.S.C. 154(b) by 0 days.

This patent is subject to a terminal disclaimer.

(21) Appl. No.: 14/153,562

(22) Filed: Jan. 13, 2014

(65) Prior Publication Data

US 2014/0124699 A1 May 8, 2014

Related U.S. Application Data

(63) Continuation of application No. 13/005,391, filed on Jan. 12, 2011, now Pat. No. 8,628,681.

(30) Foreign Application Priority Data

May 20, 2010 (GB) .................................. 1008438.2
Jun. 16, 2010 (GB) .................................. 1010057.6

(51) Int. Cl.
| | | |
|---|---|---|
| C09K 5/04 | (2006.01) | |
| B60H 1/32 | (2006.01) | |
| C08J 9/12 | (2006.01) | |
| C09K 3/30 | (2006.01) | |
| C11D 7/50 | (2006.01) | |
| B01D 11/00 | (2006.01) | |
| C08J 9/14 | (2006.01) | |
| C09K 3/00 | (2006.01) | |

(52) U.S. Cl.
CPC .............. *C09K 5/045* (2013.01); *B60H 1/3204* (2013.01); *C08J 9/127* (2013.01); *C09K 3/30* (2013.01); *C11D 7/5018* (2013.01); *B01D 11/00* (2013.01); *C08J 9/122* (2013.01); *C08J 9/149* (2013.01); *C09K 3/00* (2013.01); *C11D 7/5027* (2013.01); *C08J 2203/06* (2013.01); *C08J 2203/14* (2013.01); *C08J 2203/142* (2013.01); *C08J 2203/162* (2013.01); *C09K 2205/106* (2013.01); *C09K 2205/12* (2013.01); *C09K 2205/126* (2013.01)
USPC .................. 252/67; 252/68; 252/69; 252/364; 521/131; 62/114; 134/36; 60/531

(58) Field of Classification Search
CPC .............. C09K 5/045; C09K 2205/126; C09K 2205/122; C08J 9/14; C08J 9/12; B08B 3/04
USPC ........... 252/67, 68, 69, 364; 521/131; 62/114; 134/36; 60/531
See application file for complete search history.

(56) References Cited

U.S. PATENT DOCUMENTS

| | | |
|---|---|---|
| 3,723,318 A | 3/1973 | Butler |
| 3,884,828 A | 5/1975 | Butler |
| 4,879,396 A | 11/1989 | Ozero |
| 5,053,155 A | 10/1991 | Mahler |
| 5,616,275 A | 4/1997 | Chisolm et al. |
| 5,714,083 A | 2/1998 | Turner |
| 5,788,886 A | 8/1998 | Minor et al. |
| 6,258,292 B1 | 7/2001 | Turner |
| 6,374,629 B1 | 4/2002 | Oberle et al. |
| 6,426,019 B1 | 7/2002 | Acharya et al. |
| 7,238,299 B2 | 7/2007 | Singh et al. |
| 7,279,451 B2 | 10/2007 | Singh et al. |
| 7,629,306 B2 | 12/2009 | Shankland et al. |
| 7,829,748 B1 | 11/2010 | Tung et al. |
| 7,846,355 B2 | 12/2010 | Nappa et al. |
| 7,862,742 B2 | 1/2011 | Minor et al. |
| 8,808,570 B2 * | 8/2014 | Low .................................. 252/67 |
| 2002/0046568 A1 | 4/2002 | Thomas et al. |
| 2003/0042463 A1 | 3/2003 | Arman et al. |
| 2004/0119047 A1 | 6/2004 | Singh et al. |
| 2004/0127383 A1 | 7/2004 | Pham et al. |
| 2004/0256594 A1 * | 12/2004 | Singh et al. ..................... 252/71 |
| 2005/0233923 A1 | 10/2005 | Singh et al. |
| 2005/0233932 A1 | 10/2005 | Singh et al. |
| 2005/0247905 A1 | 11/2005 | Singh et al. |
| 2006/0043331 A1 | 3/2006 | Shankland et al. |
| 2006/0243944 A1 | 11/2006 | Minor et al. |
| 2006/0243945 A1 * | 11/2006 | Minor et al. ..................... 252/67 |
| 2007/0007488 A1 | 1/2007 | Singh et al. |
| 2007/0010592 A1 | 1/2007 | Bowman et al. |
| 2007/0069175 A1 | 3/2007 | Thomas et al. |
| 2007/0108403 A1 | 5/2007 | Sievert et al. |
| 2007/0210275 A1 | 9/2007 | Luly et al. |
| 2007/0210276 A1 | 9/2007 | Luly et al. |

(Continued)

FOREIGN PATENT DOCUMENTS

| | | |
|---|---|---|
| CA | 668494 | 8/1963 |
| CN | 95117074.0 | 10/1995 |

(Continued)

OTHER PUBLICATIONS

Poling, B.E. et al.; The Properties of Gases and Liquids, 2001, Chapters 2, 3, 4, 6, 7, and 8.

(Continued)

*Primary Examiner* — Douglas McGinty

(74) *Attorney, Agent, or Firm* — Ryan Kromholz & Manion, S.C.

(57) ABSTRACT

A heat transfer composition comprising trans-1,3,3,3-tetrafluoropropene (R-1234ze(E)), carbon dioxide (R-744) and a third component selected from difluoromethane (R-32), 1,1-difluoroethane (R-152a), fluoroethane (R-161), 1,1,1,2-tetrafluoroethane (R-134a), propylene, propane and mixtures thereof.

67 Claims, 1 Drawing Sheet

(56) References Cited

U.S. PATENT DOCUMENTS

| | | |
|---|---|---|
| 2007/0290177 A1 | 12/2007 | Singh et al. |
| 2008/0069177 A1 | 3/2008 | Minor et al. |
| 2008/0099190 A1 | 5/2008 | Singh et al. |
| 2008/0121837 A1 | 5/2008 | Singh et al. |
| 2008/0171652 A1 | 7/2008 | Singh et al. |
| 2008/0230738 A1 | 9/2008 | Minor et al. |
| 2008/0308763 A1 | 12/2008 | Singh et al. |
| 2008/0314073 A1 | 12/2008 | Minor et al. |
| 2009/0120619 A1 | 5/2009 | Sievert et al. |
| 2009/0158771 A1 | 6/2009 | Low et al. |
| 2009/0253820 A1 | 10/2009 | Bowman et al. |
| 2009/0278076 A1 | 11/2009 | Singh et al. |
| 2009/0285764 A1 | 11/2009 | Singh et al. |
| 2009/0302285 A1 | 12/2009 | Singh et al. |
| 2010/0025619 A1 | 2/2010 | Riva et al. |
| 2010/0044619 A1 | 2/2010 | Hulse et al. |
| 2010/0075046 A1 | 3/2010 | Hakamada et al. |
| 2010/0122545 A1 | 5/2010 | Minor et al. |
| 2010/0200798 A1 | 8/2010 | Rao et al. |
| 2013/0119299 A1 | 5/2013 | Low |
| 2013/0126776 A1* | 5/2013 | Low ................ 252/68 |
| 2013/0126777 A1* | 5/2013 | Low ................ 252/68 |
| 2013/0126778 A1 | 5/2013 | Low |

FOREIGN PATENT DOCUMENTS

| | | |
|---|---|---|
| CN | 101864276 | 10/2010 |
| DE | 4116274 | 11/1992 |
| EP | 0128506 | 12/1984 |
| EP | 0200518 | 11/1986 |
| EP | 0373683 | 6/1990 |
| EP | 0398147 | 11/1990 |
| EP | 0582451 | 2/1994 |
| EP | 1167894 | 1/2002 |
| EP | 1832640 | 9/2007 |
| EP | 1985080 | 10/2008 |
| EP | 2036943 | 3/2009 |
| EP | 1716216 | 11/2009 |
| EP | 2149592 | 2/2010 |
| EP | 2246649 | 11/2010 |
| EP | 2249104 | 11/2010 |
| GB | 3950876 | 2/1964 |
| GB | 2435747 | 9/2007 |
| GB | 2440258 | 1/2008 |
| JP | 4110388 | 4/1992 |
| RU | 2073058 | 2/1997 |
| WO | WO 95/32169 | 11/1995 |
| WO | WO98/50331 | 11/1998 |
| WO | WO2004/037752 | 5/2004 |
| WO | WO2004/037913 | 5/2004 |
| WO | WO2005/042663 | 5/2005 |
| WO | WO2005/103190 | 11/2005 |
| WO | WO2005/103191 | 11/2005 |
| WO | WO2005/103192 | 11/2005 |
| WO | WO2005/105947 | 11/2005 |
| WO | WO2005/108522 | 11/2005 |
| WO | WO2005/108523 | 11/2005 |
| WO | WO2006/094303 | 9/2006 |
| WO | WO2007/002625 | 1/2007 |
| WO | WO2007/035697 | 3/2007 |
| WO | WO2007053697 | 5/2007 |
| WO | WO2007/109748 | 9/2007 |
| WO | WO2008/027555 | 3/2008 |
| WO | WO2008/065011 | 6/2008 |
| WO | WO2008/076272 | 6/2008 |
| WO | WO2008/121776 | 10/2008 |
| WO | WO2008/121783 | 10/2008 |
| WO | WO2008/121785 | 10/2008 |
| WO | WO 2009/047535 | 4/2009 |
| WO | WO 2009/047542 | 4/2009 |
| WO | WO2009/134957 | 11/2009 |
| WO | WO2009/151669 | 12/2009 |
| WO | WO 2009/151669 | 12/2009 |
| WO | WO2010/000993 | 1/2010 |
| WO | WO2010/000994 | 1/2010 |
| WO | WO2010/002020 | 1/2010 |
| WO | WO2010/002023 | 1/2010 |
| WO | WO2010/056695 | 5/2010 |
| WO | WO2010/059677 | 5/2010 |
| WO | WO 2010/065005 | 6/2010 |
| WO | WO2010/075046 | 7/2010 |
| WO | WO2010075046 | 7/2010 |
| WO | WO2010/088320 | 8/2010 |
| WO | WO2010119265 | 10/2010 |

OTHER PUBLICATIONS http://en.wikipedia.org/wiki/Total Equivalent warming impact, Nov. 29, 2011.

http://www.sae.org/events/aars/presentations/2007papsavva.pdf Jul. 17, 2007.

Althouse et al.; Modern refrigeration and Air Conditioning, 1968, Chapters 26 and 27.

ASHRAE Standard 34-2007 Designation and Safety Classification of Refrigerants, copyright 2007.

Downing, Fluorocarbon Refrigerants Handbook, 1988, Prentice-Hall, pp. 21-22 and pp. 371-372.

Kleiber, Vapor-liquid equilibria of binary refrigerant mixtures containing propylene or R134a, Fluid Phase Equilib., 1994 pp. 149-194.

Lee et al., Phase Equilibria of Chlorofluorocarbon Alternative Refrigerant Mixtures, J. Chem. Eng. Data 1999, 44, 190-192.

Ho et al., Measurement of Vapor-Liquid Equilibria for the Binary Mixture Difluoromethane (HFC-32) + Propylene (R-1270), J. Chem, Eng, Data 2005, 50, 419-424.

Nagel et al., Vapour-liquid equilibrium of ternary mixtures of the refrigerants R32, R125 and R134a, Int J. Refrig. vol. 18, No. 8, pp. 534-543, 1995.

NASA Contract NAS-7-918, Technical Support Package on Nearly Azeotropic Mixtures to Replace Refrigerant 12, Aug. 1992.

Regulation of the European Parliament and of Council on certain Fluorinated Greenhouse Gases, Brussels, 2003.

Rivollet et al., Vapor-liquid equilibrium data for carbon dioxide (CO2) + difluoromethane (R32) system at temperatures . . . , Fluid Phase Equilibria 218 (2004) 95-101.

Kutz, Mechanical Engineers' Handbook, 1998, 2nd Edition, p. 1887.

Takizawa et al., Reaction stoichiometry for combustionof fluoroethane blends, ASHRAE Trans., 2006 pp. 459-468.

Orkin et al., Photochemistry of Bromine-Containing Fluorinated Alkenes: Reactivity toward OH and UV Spectra, J. Phys. Chem. A. 2002, 106, 10195-10199.

Van Ness et al., Vapor-Liquid Equilibrimm ALChE Journal, 1978, pp. 1055-1063.

Langley, Refrigeration and Air Conditioning, 1986 3rd Edition, pp. 525-526.

Puhl, Presentation at VDA Winter Meeting at Saalfelden, Feb. 11-12, 2009.

US Dept for Commerce, NIST Reference Fluid Thermodynamic and Transport Properties—REFRPROP User Guide, Version 8, Apr. 2007.

Papasavva, S., Hill, W.R., SAE 8th Alternate Refrigerant Systems Symposium, Jul. 17, 2007.

Barrault et al. "Analysis of the economic and environmental consequences of a phase out or considerable reduction leakage of mobile air conditioners", Feb. 2003.

The Scientific Assessment of Ozone Depletion 2002. Controlled Substances and Other Sources, Section 1, "Controlled Substances and Other Source Gases." Montzka et al.

The Scientific Assessment of Ozone Depletion 2002. Controlled Substances and Other Sources, Section 6, "Radiative Forcing of Climate Change."

HFOs: New, Low Global Warming Potential Refrigerants, J. Steven Brown, PhD., ASHRAE Journal, Aug. 2009.

"Lifetimes, radiative efficiencies, and direct (except for CH4) GWPs relative to CO2", chart and graph, 2005.

ASTM E681-04 "Standard test method for concentration limits of flammability of chemicals (Vapors and gases)," Jun. 14, 2012.

ASTM E681-04 Annex 1, Jun. 14, 2012.

(56) References Cited

OTHER PUBLICATIONS

USPTO Office Action dated Mar. 28, 2013 regarding U.S. Appl. No. 13/005,391, 8 pages.
International Search Report dated Mar. 26, 2010 regarding International Appln No. PCT/GB2009/002803, 6 pages.
International Preliminary Report on Patentability and Written Opinion dated Jun. 7, 2011, regarding International Appln No. PCT/GB2009/002803, 7 pages.
International Search Report dated Mar. 26, 2010, regarding International Appln No. PCT/GB2009/002805, 5 pages.
International Preliminary Report on Patentability and Written Opinion dated Jun. 7, 2011, regarding International Appln No. PCT/GB2009/002805, 7 pages.
International Search Report dated Mar. 29, 2010 regarding International Appln No. PCT/GB2009/002809, 5 pages.
International Preliminary Report on Patentability and Written Opinion dated Jun. 7, 2011, regarding International Appln No. PCT/GB2009/002809, 7 pages.
International Search Report dated May 8, 2010, regarding International Appln No. PCT/GB2010/000774, 6 pages.
International Preliminary Report on Patentability and Written Opinion dated Oct. 18, 2011, regarding International Appln No. PCT/GB202010/000774, 10 pages.

* cited by examiner

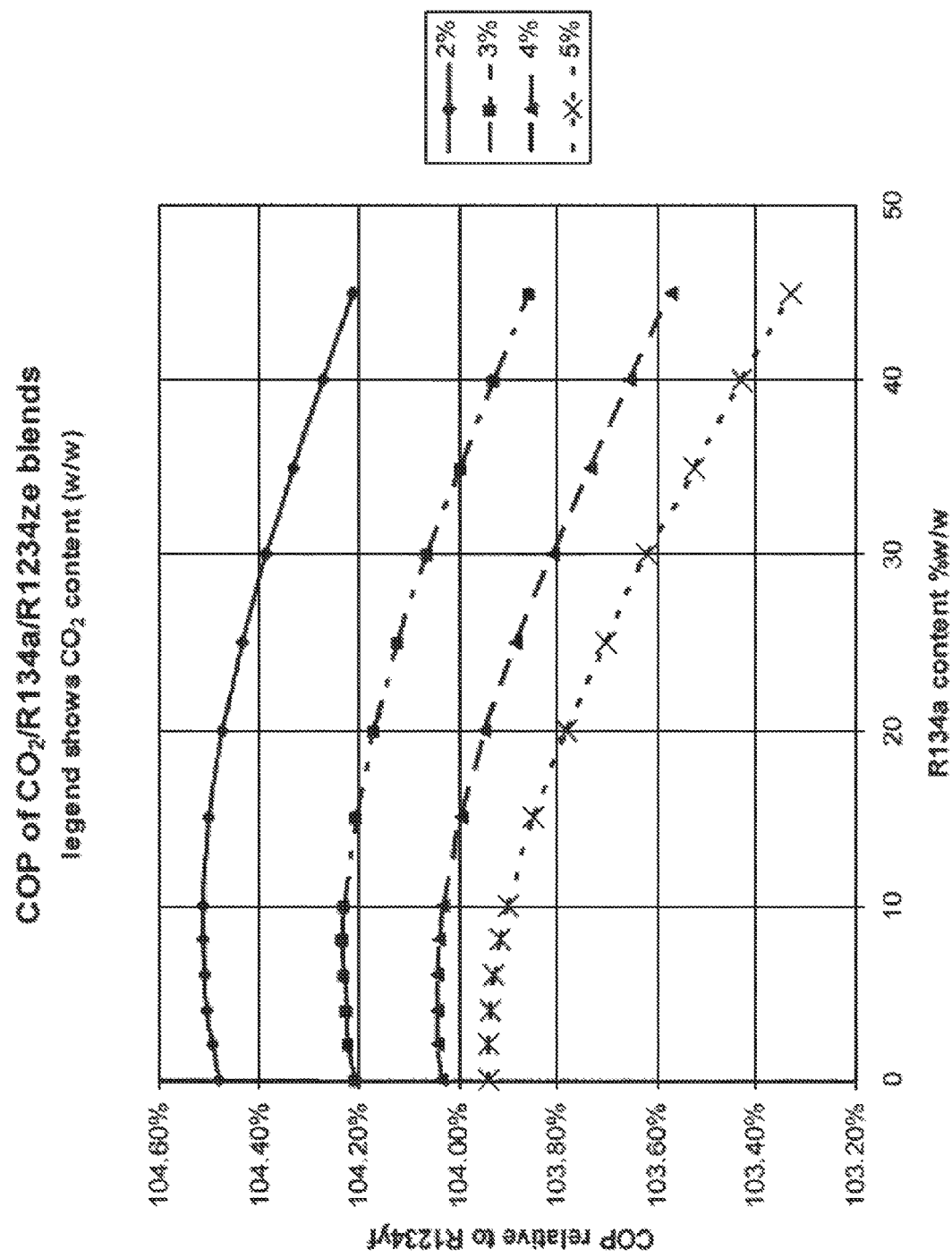

HEAT TRANSFER COMPOSITIONS

RELATED APPLICATIONS

The present application is a continuation of U.S. patent application Ser. No. 13/005,391, filed on Jan. 12, 2011, which claims priority to Great Britain Patent Application No. 1008438.2, filed on May 20, 2010, and Great Britain Application 1010057.6, filed Jun. 16, 2010.

BACKGROUND OF THE INVENTION

The invention relates to heat transfer compositions, and in particular to heat transfer compositions which may be suitable as replacements for existing refrigerants such as R-134a, R-152a, R-1234yf, R-22, R-410A, R-407A, R-407B, R-407C, R507 and R-404a.

The listing or discussion of a prior-published document or any background in the specification should not necessarily be taken as an acknowledgement that a document or background is part of the state of the art or is common general knowledge.

Mechanical refrigeration systems and related heat transfer devices such as heat pumps and air-conditioning systems are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

In addition to having a suitable boiling point and a high latent heat of vaporisation, the properties preferred in a refrigerant include low toxicity, non-flammability, non-corrosivity, high stability and freedom from objectionable odour. Other desirable properties are ready compressibility at pressures below 25 bars, low discharge temperature on compression, high refrigeration capacity, high efficiency (high coefficient of performance) and an evaporator pressure in excess of 1 bar at the desired evaporation temperature.

Dichlorodifluoromethane (refrigerant R-12) possesses a suitable combination of properties and was for many years the most widely used refrigerant. Due to international concern that fully and partially halogenated chlorofluorocarbons were damaging the earth's protective ozone layer, there was general agreement that their manufacture and use should be severely restricted and eventually phased out completely. The use of dichlorodifluoromethane was phased out in the 1990's.

Chlorodifluoromethane (R-22) was introduced as a replacement for R-12 because of its lower ozone depletion potential. Following concerns that R-22 is a potent greenhouse gas, its use is also being phased out.

Whilst heat transfer devices of the type to which the present invention relates are essentially closed systems, loss of refrigerant to the atmosphere can occur due to leakage during operation of the equipment or during maintenance procedures. It is important, therefore, to replace fully and partially halogenated chlorofluorocarbon refrigerants by materials having zero ozone depletion potentials.

In addition to the possibility of ozone depletion, it has been suggested that significant concentrations of halocarbon refrigerants in the atmosphere might contribute to global warming (the so-called greenhouse effect). It is desirable, therefore, to use refrigerants which have relatively short atmospheric lifetimes as a result of their ability to react with other atmospheric constituents such as hydroxyl radicals, or as a result of ready degradation through photolytic processes.

R-410A and R-407 refrigerants (including R-407A, R-407B and R-407C) have been introduced as a replacement refrigerant for R-22. However, R-22, R-410A and the R-407 refrigerants all have a high global warming potential (GWP, also known as greenhouse warming potential).

1,1,1,2-tetrafluoroethane (refrigerant R-134a) was introduced as a replacement refrigerant for R-12. R-134a is an energy efficient refrigerant, used currently for automotive air conditioning. However it is a greenhouse gas with a GWP of 1430 relative to CO2 (GWP of CO 2 is 1 by definition). The proportion of the overall environmental impact of automotive air conditioning systems using this gas, which may be attributed to the direct emission of the refrigerant, is typically in the range 10-20%. Legislation has now been passed in the European Union to rule out use of refrigerants having GWP of greater than 150 for new models of car from 2011. The car industry operates global technology platforms, and in any event emission of greenhouse gas has global impact, thus there is a need to find fluids having reduced environmental impact (e.g. reduced GWP) compared to HFC-134a.

R-152a (1,1-difluoroethane) has been identified as an alternative to R-134a. It is somewhat more efficient than R-134a and has a greenhouse warming potential of 120. However the flammability of R-152a is judged too high, for example to permit its safe use in mobile air conditioning systems. In particular it is believed that its lower flammable limit in air is too low, its flame speeds are too high, and its ignition energy is too low.

Thus there is a need to provide alternative refrigerants having improved properties such as low flammability. Fluorocarbon combustion chemistry is complex and unpredictable. It is not always the case that mixing a non-flammable fluorocarbon with a flammable fluorocarbon reduces the flammability of the fluid or reduces the range of flammable compositions in air. For example, the inventors have found that if non-flammable R-134a is mixed with flammable R-152a, the lower flammable limit of the mixture alters in a manner which is not predictable. The situation is rendered even more complex and less predictable if ternary or quaternary compositions are considered.

There is also a need to provide alternative refrigerants that may be used in existing devices such as refrigeration devices with little or no modification.

R-1234yf (2,3,3,3-tetrafluoropropene) has been identified as a candidate alternative refrigerant to replace R-134a in certain applications, notably the mobile air conditioning or heat pumping applications. Its GWP is about 4. R-1234yf is flammable but its flammability characteristics are generally regarded as acceptable for some applications including mobile air conditioning or heat pumping. In particular, when compared with R-152a, its lower flammable limit is higher, its minimum ignition energy is higher and the flame speed in air is significantly lower than that of R-152a.

The environmental impact of operating an air conditioning or refrigeration system, in terms of the emissions of greenhouse gases, should be considered with reference not only to the so-called "direct" GWP of the refrigerant, but also with reference to the so-called "indirect" emissions, meaning those emissions of carbon dioxide resulting from consumption of electricity or fuel to operate the system. Several metrics of this total GWP impact have been developed, including those known as Total Equivalent Warming Impact (TEWI) analysis, or Life-Cycle Carbon Production (LCCP) analysis. Both of these measures include estimation of the effect of refrigerant GWP and energy efficiency on overall warming impact. Emissions of carbon dioxide associated with manufacture of the refrigerant and system equipment should also be considered.

The energy efficiency and refrigeration capacity of R-1234yf have been found to be significantly lower than those of R-134a and in addition the fluid has been found to exhibit increased pressure drop in system pipework and heat exchangers. A consequence of this is that to use R-1234yf and achieve energy efficiency and cooling performance equivalent to R-134a, increased complexity of equipment and increased size of pipework is required, leading to an increase in indirect emissions associated with equipment. Furthermore, the production of R-1234yf is thought to be more complex and less efficient in its use of raw materials (fluorinated and chlorinated) than R-134a. Current projections of long term pricing for R-1234yf is in the range 10-20 times greater than R-134a. This price differential and the need for extra expenditure on hardware will limit the rate at which refrigerants are changed and hence limit the rate at which the overall environmental impact of refrigeration or air conditioning may be reduced. In summary, the adoption of R-1234yf to replace R-134a will consume more raw materials and result in more indirect emissions of greenhouse gases than does R-134a.

Some existing technologies designed for R-134a may not be able to accept even the reduced flammability of some heat transfer compositions (any composition having a GWP of less than 150 is believed to be flammable to some extent).

SUMMARY OF THE INVENTION

A principal object of the present invention is therefore to provide a heat transfer composition which is usable in its own right or suitable as a replacement for existing refrigeration usages which should have a reduced GWP, yet have a capacity and energy efficiency (which may be conveniently expressed as the "Coefficient of Performance") ideally within 10% of the values, for example of those attained using existing refrigerants (e.g. R-134a, R-152a, R-1234yf, R-22, R-410A, R-407A, R-407B, R-407C, R507 and R-404a), and preferably within less than 10% (e.g. about 5%) of these values. It is known in the art that differences of this order between fluids are usually resolvable by redesign of equipment and system operational features. The composition should also ideally have reduced toxicity and acceptable flammability.

The subject invention addresses the above deficiencies by the provision of a heat transfer composition comprising 1,3,3,3-tetrafluoropropene (R-1234ze), carbon dioxide (also referred to herein as R-744 or CO2) and a third component selected from difluoromethane (R-32), 1,1-difluoroethane (R-152a), fluoroethane (R-161), 1,1,1,2-tetrafluoroethane (R-134a), propylene (R-1270), propane (R-290) and mixtures thereof. This will be referred to hereinafter as the composition of the invention, unless otherwise stated.

DESCRIPTION OF THE DRAWING FIGURE

FIG. 1 is a graphical representation of the Coefficient of Performance (COP) of $CO_2$/R-134a/R-1234ze blends relative to R-1234yf.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

All of the chemicals herein described are commercially available. For example, the fluorochemicals may be obtained from Apollo Scientific (UK).

Typically, the compositions of the invention contain trans-1,3,3,3-tetrafluoropropene (R-1234ze(E)).

In one embodiment, the compositions of the invention contain at least about 45% by weight R-1234ze(E), for example from about 50 to about 98% by weight. Preferably, the compositions of the invention contain from about 60% to about 98% by weight R-1234ze(E). Advantageously, the compositions of the invention contain from about 70 to about 98% by weight R-1234ze(E).

The preferred amounts and choice of components for the invention are determined by a combination of properties:

(a) Flammability: non flammable or weakly flammable compositions are preferred.

(b) Effective operating temperature of the refrigerant in an air conditioning system evaporator.

(c) Temperature "glide" of the mixture and its effect on heat exchanger performance.

The effective operating temperature in an air conditioning cycle, especially automotive air conditioning, is limited by the need to avoid ice formation on the air-side surface of the refrigerant evaporator. Typically air conditioning systems must cool and dehumidify humid air; so liquid water will be formed on the air-side surface. Most evaporators (without exception for the automotive application) have finned surfaces with narrow fin spacing. If the evaporator is too cold then ice can be formed between the fins, restricting the flow of air over the surface and reducing overall performance by reducing the working area of the heat exchanger.

It is known for automotive air-conditioning applications (Modern Refrigeration and Air Conditioning by A D Althouse et al, 1988 edition, Chapter 27, which is incorporated herein by reference) that refrigerant evaporation temperatures of −2° C. or higher are preferred to ensure that the problem of ice formation is thereby avoided.

It is also known that non-azeotropic refrigerant mixtures exhibit temperature "glide" in evaporation or condensation. In other words, as the refrigerant is progressively vaporised or condensed at constant pressure, the temperature rises (in evaporation) or drops (in condensation), with the total temperature difference (inlet to outlet) being referred to as the temperature glide. The effect of glide on evaporation and condensation temperature must also be considered.

The carbon dioxide content of the compositions of the invention is limited primarily by considerations (b) and (c) above. Conveniently, the compositions of the invention contain up to about 12% by weight R-744. Preferably, the compositions of the invention contain from about 1 to about 10% R-744. Advantageously, the compositions of the invention contain from about 2 to about 7% by weight R-744.

The content of the third component, which may include flammable refrigerants (R-32, R-152a, R-161, propylene or propane), is selected so that even in the absence of the carbon dioxide element of the composition, the residual fluorocarbon mixture has a lower flammable limit in air at 23° C. (as determined in the ASHRAE-34 12 liter flask test apparatus) which is greater than 5% v/v, preferably greater than 6% v/v, most preferably such that the mixture is non-flammable. The issue of flammability is discussed further later in this specification.

Typically, the compositions of the invention contain up to about 50% by weight of the third component. Conveniently, the compositions of the invention contain up to about 45% by weight of the third component. Preferably, the compositions of the invention contain from about 1 to about 40% by weight of the third component.

As used herein, all % amounts mentioned in compositions herein, including in the claims, are by weight based on the total weight of the compositions, unless otherwise stated.

For the avoidance of doubt, it is to be understood that the stated upper and lower values for ranges of amounts of components in the compositions of the invention described herein may be interchanged in any way, provided that the resulting ranges fall within the broadest scope of the invention.

The compositions of the invention may consist essentially of (or consist of) R-1234ze(E), R-744 and the third component.

By the term "consist essentially of", we mean that the compositions of the invention contain substantially no other components, particularly no further (hydro)(fluoro) compounds (e.g. (hydro)(fluoro)alkanes or (hydro)(fluoro)alkenes) known to be used in heat transfer compositions. We include the term "consist of" within the meaning of "consist essentially of".

For the avoidance of doubt, any of the compositions of the invention described herein, including those with specifically defined compounds and amounts of compounds or components, may consist essentially of (or consist of) the compounds or components defined in those compositions.

In one aspect, the third component contains only one of difluoromethane (R-32), 1,1-difluoroethane (R-152a), fluoroethane (R-161), 1,1,1,2-tetrafluoroethane (R-134a), propylene or propane. Thus, the compositions of the invention may be ternary blends of R-1234ze(E), R-744 and one of R-32, R-152a, R-161, R-134a, propylene or propane.

However, mixtures of one or more of these compounds can be used as the third component. For example, the third component may include R-134a together with one of R-32, R-152a, R-161, propylene or propane. The R-134a typically is included to reduce the flammability of the equivalent composition that does not contain R-134a.

Preferably, the compositions of the invention which contain R-134a are non-flammable at a test temperature of 60° C. using the ASHRAE-34 methodology. Advantageously, the mixtures of vapour that exist in equilibrium with the compositions of the invention at any temperature between about −20° C. and 60° C. are also non-flammable.

Advantageously, the third component is selected from R-32, R-152a, R-161, R-134a and mixtures thereof.

In one embodiment, the third component comprises R-32. The third component may consist essentially of (or consist of) R-32.

Compositions of the invention which contain R-32 typically contain it in an amount of from about 2 to about 20% by weight, conveniently in an amount of from about 2 to about 15% by weight, for example from about 4 to about 10% by weight.

Preferred compositions of the invention contain from about 82 to about 96% R-1234ze(E), from about 2 to about 6% by weight R-744 and from about 2 to about 12% by weight R-32.

Further preferred compositions of the invention contain from about 85 to about 96% R-1234ze(E), from about 2 to about 6% by weight R-744 and from about 2 to about 12% by weight R-32.

In one embodiment, the third component comprises R-152a. The third component may consist essentially of (or consist of) R-152a.

Compositions of the invention which contain R-152a typically contain it in an amount of from about 2 to about 45% by weight, conveniently in an amount of from about 3 to about 30% by weight, preferably from about 4 to about 20% (for example from about 5 to about 15% by weight).

Preferred compositions of the invention contain from about 75 to about 96% by weight R-1234ze(E), from about 2 to about 5% by weight R-744 and from about 2 to about 20% by weight R-152a.

Further preferred compositions contain from about 85 to about 94% (e.g. about 87 to about 92%) by weight R-1234ze(E), from about 3 to about 8% (e.g. about 4 to about 7%) by weight R-744 and from about 3 to about 7% e.g. (about 4 to about 6%) by weight R-152a.

In one embodiment, the third component comprises R-161. The third component may consist essentially of (or consist of) R-161.

Compositions of the invention which contain R-161 typically contain it in an amount of from about 2 to about 30% by weight, conveniently in an amount of from about 3 to about 20% by weight, for example from about 4 to about 15% by weight.

Preferred compositions of the invention contain from about 85 to about 96% R-1234ze(E), from about 2 to about 5% by weight R-744 and from about 2 to about 10% by weight R-161.

In one embodiment, the third component comprises propylene. The third component may consist essentially of (or consist of) propylene.

Compositions of the invention which contain propylene typically contain it in an amount of from about 1 to about 10% by weight, conveniently in an amount of from about 2 to about 8% by weight, for example from about 3 to about 6% by weight.

Preferred compositions of the invention contain from about 87 to about 96% R-1234ze(E), from about 2 to about 5% by weight R-744 and from about 2 to about 8% by weight propylene.

Further preferred compositions of the invention contain from about 89 to about 96% R-1234ze(E), from about 2 to about 5% by weight R-744 and from about 2 to about 8% by weight propylene.

In one embodiment, the third component comprises propane. The third component may consist essentially of (or consist of) propane.

Compositions of the invention which contain propane typically contain it in an amount of from about 1 to about 10% by weight, conveniently in an amount of from about 2 to about 8% by weight, for example from about 3 to about 6% by weight.

Preferred compositions of the invention contain from about 87 to about 96% R-1234ze(E), from about 2 to about 5% by weight R-744 and from about 2 to about 8% by weight propane.

Further preferred compositions of the invention contain from about 89 to about 96% R-1234ze(E), from about 2 to about 5% by weight R-744 and from about 2 to about 8% by weight propane.

In one embodiment, the third component comprises R-134a. The third component may consist essentially of (or consist of) R-134a.

Compositions of the invention which contain R-134 typically contain it in an amount of from about 1 to about 50% by weight, for instance about 2 to about 45% by weight. Conveniently the R-134a is present in an amount of from about 2 to about 30% by weight, for example from about 2 to about 20% by weight.

Preferred compositions of the invention contain from about 44 to about 96% R-1234ze(E), from about 2 to about 6% by weight R-744 and from about 2 to about 50% by weight R-134a.

Further preferred compositions of the invention contain from about 49 to about 96% R-1234ze(E), from about 2 to about 6% by weight R-744 and from about 2 to about 45% by weight R-134a.

In one aspect, the compositions of the invention contain from about 79 to about 96% R-1234ze(E), from about 2 to about 6% by weight R-744 and from about 2 to about 15% by weight R-134a.

In one aspect, the compositions of the invention contain from about 79 to about 94% R-1234ze(E), from about 4 to about 6% by weight R-744 and from about 2 to about 15% (e.g. about 6 to about 15%) by weight R-134a.

Examples of such compositions are ternary blends containing about 84% by weight 1234ze(E), about 6% by weight R-744 and about 10% by weight R-134a or containing from about 86% by weight 1234ze(E), about 5% by weight R-744 and about 9% by weight R-134a.

The compositions of the invention may further contain pentafluoroethane (R-125). If present, R-125 typically is present in amounts up to about 40% by weight, preferably from about 2 to about 20% by weight.

Compositions according to the invention conveniently comprise substantially no R-1225 (pentafluoropropene), conveniently substantially no R-1225ye (1,2,3,3,3-pentafluoropropene) or R-1225zc (1,1,3,3,3-pentafluoropropene), which compounds may have associated toxicity issues.

By "substantially no", we include the meaning that the compositions of the invention contain 0.5% by weight or less of the stated component, preferably 0.1% or less, based on the total weight of the composition.

The compositions of the invention may contain substantially no:
(i) 2,3,3,3-tetrafluoropropene (R-1234yf),
(ii) cis-1,3,3,3-tetrafluoropropene (R-1234ze(Z)), and/or
(iii) 3,3,3-trifluoropropene (R-1243zf).

The compositions of the invention have zero ozone depletion potential.

Preferably, the compositions of the invention (e.g. those that are suitable refrigerant replacements for R-134a, R-1234yf or R-152a) have a GWP that is less than 1300, preferably less than 1000, more preferably less than 800, 500, 400, 300 or 200, especially less than 150 or 100, even less than 50 in some cases. Unless otherwise stated, IPCC (Intergovernmental Panel on Climate Change) TAR (Third Assessment Report) values of GWP have been used herein.

Advantageously, the compositions are of reduced flammability hazard when compared to the individual flammable components of the compositions, e.g. R-32, R-161, R-152a, propane or propylene. Preferably, the compositions are of reduced flammability hazard when compared to R-1234yf.

In one aspect, the compositions have one or more of (a) a higher lower flammable limit; (b) a higher ignition energy; or (c) a lower flame velocity compared to R-32, R-152a, R-161, propane, propylene or R-1234yf. In a preferred embodiment, the compositions of the invention are non-flammable. Advantageously, the mixtures of vapour that exist in equilibrium with the compositions of the invention at any temperature between about −20° C. and 60° C. are also non-flammable.

Flammability may be determined in accordance with ASHRAE Standard 34 incorporating the ASTM Standard E-681 with test methodology as per Addendum 34p dated 2004, the entire content of which is incorporated herein by reference.

In some applications it may not be necessary for the formulation to be classed as non-flammable by the ASHRAE-34 methodology; it is possible to develop fluids whose flammability limits will be sufficiently reduced in air to render them safe for use in the application, for example if it is physically not possible to make a flammable mixture by leaking the refrigeration equipment charge into the surrounds.

R-1234ze(E) is non-flammable in air at 23° C., although it exhibits flammability at higher temperatures in humid air. We have determined by experimentation that mixtures of R-1234ze(E) with flammable fluorocarbons such as HFC-32, HFC-152a or HFC-161 will remain non-flammable in air at 23° C. if the "fluorine ratio" Rf of the mixture is greater than about 0.57, where Rf is defined per gram-mole of the overall refrigerant mixture as:

$$Rf = (\text{gram-moles of fluorine})/(\text{gram-moles fluorine} + \text{gram-moles hydrogen})$$

Thus for R-161, $Rf=1/(1+5)=1/6$ (0.167) and it is flammable, in contrast R-1234ze(E) has $R=4/6$ (0.667) and it is non-flammable. We found by experiment that a 20% v/v mixture of R-161 in R-1234ze(E) was similarly non-flammable. The fluorine ratio of this non-flammable mixture is $0.2*(1/6)+0.8*(4/6)=0.567$.

The validity of this relationship between flammability and fluorine ratio of 0.57 or higher has been experimentally proven for HFC-32, HFC-152a and mixtures of HFC-32 with HFC-152a.

Takizawa et al, Reaction Stoichiometry for Combustion of Fluoroethane Blends, ASHRAE Transactions 112(2) 2006 (which is incorporated herein by reference), shows there exists a near-linear relationship between this ratio and the flame speed of mixtures comprising R-152a, with increasing fluorine ratio resulting in lower flame speeds. The data in this reference teach that the fluorine ratio needs to be greater than about 0.65 for the flame speed to drop to zero, in other words, for the mixture to be non-flammable.

Similarly, Minor et al (Du Pont Patent Application WO2007/053697) provide teaching on the flammability of many hydrofluoroolefins, showing that such compounds could be expected to be non-flammable if the fluorine ratio is greater than about 0.7.

In view of this prior art teaching, it is unexpected that that mixtures of R-1234ze(E) with flammable fluorocarbons such as HFC-32, HFC-152a or HFC-161 will remain non-flammable in air at 23° C. if the fluorine ratio R of the mixture is greater than about 0.57.

Furthermore, we identified that if the fluorine ratio is greater than about 0.46 then the composition can be expected to have a lower flammable limit in air of greater than 6% v/v at room temperature.

By producing low- or non-flammable R-744/third component/R-1234ze(E) blends containing unexpectedly low amounts of R-1234ze(E), the amounts of the third component, in particular, in such compositions are increased. This is believed to result in heat transfer compositions exhibiting increased cooling capacity, decreased temperature glide and/or decreased pressure drop, compared to equivalent compositions containing higher amounts (e.g. almost 100%) R-1234ze(E).

Thus, the compositions of the invention exhibit a completely unexpected combination of low-/non-flammability, low GWP and improved refrigeration performance properties. Some of these refrigeration performance properties are explained in more detail below.

Temperature glide, which can be thought of as the difference between bubble point and dew point temperatures of a zeotropic (non-azeotropic) mixture at constant pressure, is a characteristic of a refrigerant; if it is desired to replace a fluid with a mixture then it is often preferable to have similar or reduced glide in the alternative fluid. In an embodiment, the compositions of the invention are zeotropic.

Conveniently, the temperature glide (in the evaporator) of the compositions of the invention is less than about 10K, preferably less than about 8K.

Advantageously, the volumetric refrigeration capacity of the compositions of the invention is at least 85% of the existing refrigerant fluid it is replacing, preferably at least 90% or even at least 95%.

The compositions of the invention typically have a volumetric refrigeration capacity that is at least 90% of that of R-1234yf. Preferably, the compositions of the invention have a volumetric refrigeration capacity that is at least 95% of that of R-1234yf, for example from about 95% to about 120% of that of R-1234yf.

In one embodiment, the cycle efficiency (Coefficient of Performance, COP) of the compositions of the invention is within about 5% or even better than the existing refrigerant fluid it is replacing.

Conveniently, the compressor discharge temperature of the compositions of the invention is within about 15K of the existing refrigerant fluid it is replacing, preferably about 10K or even about 5K.

The compositions of the invention preferably have energy efficiency at least 95% (preferably at least 98%) of R-134a under equivalent conditions, while having reduced or equivalent pressure drop characteristic and cooling capacity at 95% or higher of R-134a values. Advantageously the compositions have higher energy efficiency and lower pressure drop characteristics than R-134a under equivalent conditions. The compositions also advantageously have better energy efficiency and pressure drop characteristics than R-1234yf alone.

The heat transfer compositions of the invention are suitable for use in existing designs of equipment, and are compatible with all classes of lubricant currently used with established HFC refrigerants. They may be optionally stabilized or compatibilized with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

Advantageously, the lubricant further comprises a stabiliser.

Preferably, the stabiliser is selected from the group consisting of diene-based compounds, phosphates, phenol compounds and epoxides, and mixtures thereof.

Conveniently, the composition of the invention may be combined with a flame retardant.

Advantageously, the flame retardant is selected from the group consisting of tri-(2-chloroethyl)-phosphate, (chloropropyl)phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

Preferably, the heat transfer composition is a refrigerant composition.

In one embodiment, the invention provides a heat transfer device comprising a composition of the invention.

Preferably, the heat transfer device is a refrigeration device.

Conveniently, the heat transfer device is selected from group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems.

Preferably, the heat transfer device is a refrigeration device or an air-conditioning system.

Advantageously, the heat transfer device contains a centrifugal-type compressor.

The invention also provides the use of a composition of the invention in a heat transfer device as herein described.

According to a further aspect of the invention, there is provided a blowing agent comprising a composition of the invention.

According to another aspect of the invention, there is provided a foamable composition comprising one or more components capable of forming foam and a composition of the invention.

Preferably, the one or more components capable of forming foam are selected from polyurethanes, thermoplastic polymers and resins, such as polystyrene, and epoxy resins.

According to a further aspect of the invention, there is provided a foam obtainable from the foamable composition of the invention.

Preferably the foam comprises a composition of the invention.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to another aspect of the invention, there is provided a method for extracting a material from a particulate solid matrix comprising contacting the particulate solid matrix with a solvent comprising a composition of the invention, and separating the material from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device or (a static) air conditioning system. Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

In another embodiment wherein the existing heat transfer fluid is R-134a, and the composition of the invention contains R-134a, R-1234ze(E), R-744, any other third component and/or R-125 present (and optional components such as a lubricant, a stabiliser or an additional flame retardant), R-1234ze(E) and R-744, etc, can be added to the R-134a in the heat transfer device, thereby forming the compositions of the invention, and the heat transfer device of the invention, in situ. Some of the existing R-134a may be removed from the heat transfer device prior to adding the R-1234ze(E), R-744, etc, to facilitate providing the components of the compositions of the invention in the desired proportions.

Thus, the invention provides a method for preparing a composition and/or heat transfer device of the invention comprising introducing R-1234ze(E), R-744, any other third component in addition to R-134a, any R-125 desired, and optional components such as a lubricant, a stabiliser or an additional flame retardant, into a heat transfer device containing an existing heat transfer fluid which is R-134a. Optionally, at least some of the R-134a is removed from the heat transfer device before introducing the R-1234ze(E), R-744, etc.

Of course, the compositions of the invention may also be prepared simply by mixing the R-1234ze(E), R-744, the third component, any R-125 desired (and optional components such as a lubricant, a stabiliser or an additional flame retardant) in the desired proportions. The compositions can then be added to a heat transfer device (or used in any other way as defined herein) that does not contain R-134a or any other existing heat transfer fluid, such as a device from which R-134a or any other existing heat transfer fluid have been removed.

In a further aspect of the invention, there is provided a method for reducing the environmental impact arising from operation of a product comprising an existing compound or composition, the method comprising replacing at least partially the existing compound or composition with a composition of the invention. Preferably, this method comprises the step of obtaining an allocation of greenhouse gas emission credit.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems (see, for example, http://en.wikipedia.org/wiki/Total_equivalent_warming_imp act).

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP, see for example http://www.sae.org/events/aars/presentations/2007papasavva.pdf). The use of LCCP is common in assessing environmental impact of automotive air conditioning systems.

Emission credit(s) are awarded for reducing pollutant emissions that contribute to global warming and may, for example, be banked, traded or sold. They are conventionally expressed in the equivalent amount of carbon dioxide. Thus if the emission of 1 kg of R-134a is avoided then an emission credit of 1×1300=1300 kg CO2 equivalent may be awarded.

In another embodiment of the invention, there is provided a method for generating greenhouse gas emission credit(s) comprising (i) replacing an existing compound or composition with a composition of the invention, wherein the composition of the invention has a lower GWP than the existing compound or composition; and (ii) obtaining greenhouse gas emission credit for said replacing step.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and medium temperature refrigeration), heat transfer, blowing agents, aerosols or sprayable propellants, gaseous dielectrics, cryosurgery, veterinary procedures, dental procedures, fire extinguishing, flame suppression, solvents (e.g. carriers for flavorings and fragrances), cleaners, air horns, pellet guns, topical anesthetics, and expansion applications. Preferably, the field is air-conditioning or refrigeration.

Examples of suitable products include heat transfer devices, blowing agents, foamable compositions, sprayable compositions, solvents and mechanical power generation devices. In a preferred embodiment, the product is a heat transfer device, such as a refrigeration device or an air-conditioning unit.

The existing compound or composition has an environmental impact as measured by GWP and/or TEWI and/or LCCP that is higher than the composition of the invention which replaces it. The existing compound or composition may comprise a fluorocarbon compound, such as a perfluoro-, hydrofluoro-, chlorofluoro- or hydrochlorofluoro-carbon compound or it may comprise a fluorinated olefin Preferably, the existing compound or composition is a heat transfer compound or composition such as a refrigerant. Examples of refrigerants that may be replaced include R-134a, R-152a, R-1234yf, R-410A, R-407A, R-407B, R-407C, R507, R-22 and R-404A. The compositions of the invention are particularly suited as replacements for R-134a, R-152a or R-1234yf, especially R-134a or R-1234yf.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The invention is illustrated by the following non-limiting examples, as well as information and tables included in the attached appendix.

EXAMPLES

Flammability

The flammability of certain compositions of the invention in air at atmospheric pressure and controlled humidity was studied in a flame tube test as follows.

The test vessel was an upright glass cylinder having a diameter of 2 inches. The ignition electrodes were placed 60 mm above the bottom of the cylinder. The cylinder was fitted with a pressure-release opening. The apparatus was shielded to restrict any explosion damage. A standing induction spark of 0.5 second duration was used as the ignition source.

The test was performed at 23 or 35° C. (see below). A known concentration of fuel in air was introduced into the glass cylinder. A spark was passed through the mixture and it was observed whether or not a flame detached itself from the ignition source and propagated independently. The gas concentration was increased in steps of 1% vol. until ignition occurred (if at all). The results are shown below (all compositions are v/v basis unless otherwise stated).

| Fuel | Temperature (° C.) | Humidity | Results[b] |
|---|---|---|---|
| R134a/R1234ze(E) 10/90 | 23 | 50% RH/23° C. | Non flammable |
| CO2/R134a/R1234ze 10/10/80[a] | 23 | 50% RH/23° C. | Non flammable |
| R134a/R1234yf 10/90 | 35 | 50% RH/23° C. | LFL 6% UFL 11% |
| R134a/R1234ze(E) 10/90 | 35 | 50% RH/23° C. | LFL 8% UFL 12% |
| CO2/R134a/R1234ze 10/10/80[a] | 35 | 50% RH/23° C. | LFL 10% UFL 11%[c] |

[a]This corresponds to about 4% CO2, 10% R-134a and 86% R-1234ze(E) by weight.
[b]LFL = lower flammable limit and UFL = upper flammable limit
[c]Incomplete propagation
The ternary composition 4% CO2, 10% R-134a and 86% R-1234ze(E) by weight was shown to be non-flammable at 23° C. At 35° C., it was significantly less flammable than corresponding R134a/R1234yf and R134a/R1234ze(E) mixtures.

(a) Generation of Accurate Physical Property Model

The physical properties of R-1234yf and R-1234ze(E) required to model refrigeration cycle performance, namely critical point, vapour pressure, liquid and vapour enthalpy, liquid and vapour density and heat capacities of vapour and liquid were accurately determined by experimental methods over the pressure range 0-200 bar and temperature range −40 to 200° C., and the resulting data used to generate Helmholtz free energy equation of state models for the fluid in the NIST REFPROP Version 8.0 software, which is more fully described in the user guide www.nist.gov/srd/PDFfiles/REFPROP8.PDF, and is incorporated herein by reference. The variation of ideal gas enthalpy of both fluids with temperature was estimated using molecular modelling software Hyperchem v7.5 (which is incorporated herein by reference) and the resulting ideal gas enthalpy function was used in the regression of the equation of state for these fluids.

The vapour liquid equilibrium behaviour of R-1234ze(E) was studied in a series of binary pairs with R-32, R-125, R-134a, R-152a, R-161, propane and propylene over the temperature range −40 to +60° C., which encompasses the practical operating range of most refrigeration and air conditioning systems. The composition was varied over the full compositional space for each binary in the experimental programme, This data was also incorporated into the REFPROP software model.

The resulting software model was used to compare the performance of selected fluids of the invention with R-1234yf, R-1234ze(E) as a single component, and R-134a.

(b) Ideal Air Conditioning Cycle Comparison

In a first comparison the behaviour of the fluids was assessed for a simple vapour compression cycle with conditions typical of automotive air conditioning duty in high ambient temperatures. In this comparison pressure drop effects were not included in the model. Instead the comparison was made on the basis of equal mean evaporation and condensation temperatures, and equal degrees of superheat and subcooling for each refrigerant.

The conditions used are given below, followed by comparative example data for R-1234yf, R-1234ze(E) and R-134a.

| Conditions | | |
|---|---|---|
| Refrigerant Mean condenser temperature | ° C. | 55 |
| Mean evaporator temperature | ° C. | 2 |
| Condenser subcooling | K | 5 |
| Evaporator superheat | K | 10 |
| Suction diameter | mm | 16.2 |
| Cooling capacity | kW | 6.5 |
| Evaporator pressure drop | bar | 0.00 |
| Suction line pressure drop | bar | 0.00 |
| Condenser pressure drop | bar | 0.00 |
| Compressor suction temperature | ° C. | 15 |
| Isentropic efficiency | | 65% |

| Comparative Data | | R-1234yf | R-1234ze(E) | R-134a |
|---|---|---|---|---|
| COP | | 2.44 | 2.58 | 2.57 |
| COP relative to Reference | | 100.0% | 105.5% | 105.1% |
| Volumetric capacity | kJ/m³ | 1832 | 1473 | 1990 |
| Capacity relative to Reference | | 100.0% | 80.4% | 108.6% |
| Compressor discharge temperature | ° C. | 75.7 | 79.1 | 88.8 |
| Evaporator inlet pressure | bar | 3.36 | 2.33 | 3.15 |
| Condenser inlet pressure | bar | 14.4 | 11.2 | 14.9 |
| Evaporator inlet temperature | ° C. | 2.0 | 2.0 | 2.0 |
| Evaporator glide (out-in) | K | 0.0 | 0.0 | 0.0 |
| Compressor suction pressure | bar | 3.36 | 2.33 | 3.15 |
| Compressor discharge pressure | bar | 14.4 | 11.2 | 14.9 |
| Suction line pressure drop | Pa/m | 2052 | 2269 | 1559 |
| Pressure drop relative to reference | | 100.0% | 110.6% | 76.0% |
| Condenser exit liquid temperature | ° C. | 50.0 | 50.0 | 50.0 |
| Condenser glide (in-out) | K | 0.0 | 0.0 | 0.0 |

The results of this analysis are shown in the following Tables for selected compositional families of the invention, namely:
1. CO2/R-32/R-1234ze(E)
2. CO2/R-161/R-1234ze(E)
3. CO2/R-152a/R-1234ze(E)
4. CO2/R-134a/R-1234ze(E)
5. CO2/R-1270/R-1234ze(E)
6. CO2/R-290/R-1234ze(E)

The tables show key parameters of the air conditioning cycle, including operating pressures, volumetric cooling capacity of the refrigerant, energy efficiency (expressed as Coefficient of Performance or COP), compressor discharge temperature, evaporator inlet temperature and predicted pressure drop in the compressor suction pipework.

The performance of R-1234yf is taken as a reference point for comparison of cooling capacity, energy efficiency and pressure drop.

It is evident that the compositions of the invention can offer improved energy efficiency compared to HFC-1234yf. In fact the energy efficiency of some of the compositions is comparable to that of HFC-134a.

Furthermore the cooling capacity of the fluids of the invention is close to or exceeds that of R-1234yf. Some compositions of the invention offer superior cooling capacity to R-134a and therefore may be considered as alternative to R-134a.

The operating pressure levels and compressor discharge temperature are similarly close to those for R-1234yf and R-134a.

At equivalent cooling capacity the compositions of the invention offer reduced pressure drop compared to R-1234yf. This reduced pressure drop characteristic will result in further improvement in energy efficiency (through reduction of pressure losses) in a real system. Pressure drop effects are of particular significance for automotive air conditioning so these fluids offer particular advantage for this application.

The use of hydrocarbon refrigerants in the compositions of the invention (e.g. the CO2/R-1270/R-1234ze(E) and CO2/R-290/R-1234ze(E) blends) results in an improved solubility and miscibility of the refrigerant with lubricants. In particular, the inclusion of hydrocarbon improves these properties in relation to synthetic hydrocarbon or mineral oil type lubricants, which can otherwise exhibit poor miscibility and low mutual solubility with hydrofluorocarbons such as R-134a.

Surprisingly, the use of hydrocarbon in the preferred amounts also results in an increase in cooling capacity of the refrigerant greater than may have been predicted using approximate estimation techniques. Without being bound by theory, it is believed that the non-ideal vapour-liquid equilibrium interaction of the hydrocarbons with R-1234ze(E) is responsible for this improvement. This benefit is found with both propane and propene. No azeotrope was found in determination of the vapour liquid equilibrium to exist between propene and R-1234ze(E) in the entire temperature range of relevance to the application (−40 to 60° C.) so the effect does not appear to be related to the presence of azeotropes.

In summary, the combination of hydrocarbon together with carbon dioxide and R-1234ze(E) gives an improved refrigeration performance, more versatility in selection and application of compressor lubricant, without significantly increasing the flammability hazard of R-1234ze(E) itself. These advantages are unexpected and beneficial.

The compositions containing CO2/R-134a/R-1234ze(E) are especially attractive since they have non-flammable liquid and vapour phases at 23° C. and selected compositions are also wholly non-flammable at 60° C.

FIG. 1 shows how the coefficient of performance (COP) of certain CO2/R-134a/R-1234ze(E) composition of the invention varies with R-134a content. Of particular interest is the discovery that at low levels of R-134a, (less than about 12% w/w) the coefficient of performance goes through a local maximum. Thus, unexpectedly, addition of minor quantities of R-134a results in enhancement of both cooling capacity and energy efficiency as compared to a simple binary mixture of CO2 with R-1234ze(E). Furthermore this effect occurs at overall blend GWP levels below 150, which is unexpectedly beneficial for the automotive air conditioning application.

The performance of a composition containing 6% by weight CO2, 10% by weight R-134a and 84% by weight R-1234ze(E) was tested in an automotive air conditioning system suitable for use with R-134a. This composition is denoted "Blend" in the results shown below.

The test conditions used were as described in SAE Standard J2765, which is incorporated herein by reference. These conditions are summarised below.

Ambient air condition 35° C. and 40% relative humidity (RH)

Air off temperature from evaporator controlled to 3° C.

Compressor displacement variable 0-175 cc per stroke

Conventional R-134a expansion valve was replaced with an electronic expansion valve to allow for ease of superheat adjustment System used without internal heat exchanger and with equivalent superheat at evaporator exit for all fluids The results are shown below, in which I, L, M and H refer to idle, low, medium and high speed, and wherein 35 and 45 refer to the ambient temperature in ° C.

| Measured cooling capacity (kW) | | | Relative to R-134a |
|---|---|---|---|
| Test point | R134a | Blend | Blend |
| I35 | 4.67 | 4.5 | 96% |
| L35 | 5.86 | 5.66 | 97% |
| M35 | 6.43 | 6.18 | 96% |
| H35 | 6.65 | 6.5 | 98% |
| I45 | 3.81 | 3.64 | 96% |
| L45 | 4.76 | 4.61 | 97% |
| M45 | 5.2 | 5.05 | 97% |
| H45 | 5.41 | 5.33 | 99% |

| Measured Energy Efficiency Test point | (expressed as COP) R134a | Blend | COP relative to R-134a Blend |
|---|---|---|---|
| I35 | 2.87 | 2.62 | 91% |
| L35 | 1.98 | 1.89 | 95% |
| M35 | 1.79 | 1.7 | 95% |
| H35 | 1.4 | 1.36 | 97% |
| I45 | 2.3 | 2.18 | 95% |
| L45 | 1.64 | 1.62 | 99% |
| M45 | 1.48 | 1.45 | 98% |
| H45 | 1.18 | 1.16 | 98% |

The Blend composition of the invention represents a good match of capacity and efficiency for R-134a in an R-134a air-conditioning system across a range of conditions.

Miscibility Data

The miscibility of a composition of the invention containing about 6% by weight CO2, about 10% by weight R-134a and about 84% by weight R-1234ze(E) (referred to below as Blend) was tested with the polyalkylene glycol (PAG) lubricant YN12 and the polyol ester (POE) lubricant 32H. The results of these experiments were compared to the miscibility of pure R-1234yf with the same lubricants. The results are shown below.

Miscibility Results for Blend with 32H

| Temperature | Lubricant Concentration wt % | | | | | |
|---|---|---|---|---|---|---|
| deg C. | 4 | 7 | 10 | 20 | 30 | 50 |
| −20 | miscible | miscible | miscible | miscible | miscible | miscible |
| −10 | miscible | miscible | miscible | miscible | miscible | miscible |
| 0 | miscible | miscible | miscible | miscible | miscible | miscible |
| 10 | miscible | miscible | miscible | miscible | miscible | miscible |
| 20 | miscible | miscible | miscible | miscible | miscible | miscible |
| 30 | miscible | miscible | miscible | miscible | miscible | miscible |
| 40 | miscible | miscible | miscible | miscible | miscible | miscible |
| 50 | miscible | miscible | miscible | miscible | miscible | miscible |
| 60 | miscible | miscible | miscible | miscible | miscible | miscible |
| 70 | miscible | miscible | miscible | miscible | miscible | miscible |
| 80 | miscible | miscible | miscible | miscible | miscible | miscible |

Miscibility Results for 1234yf with 32H

| Temperature | Lubricant Concentration wt % | | | | | |
|---|---|---|---|---|---|---|
| deg C. | 4 | 7 | 10 | 20 | 30 | 50 |
| −20 | miscible | miscible | miscible | miscible | miscible | miscible |
| −10 | miscible | miscible | miscible | miscible | miscible | miscible |
| 0 | miscible | miscible | miscible | miscible | miscible | miscible |
| 10 | slightly opaque | slightly opaque | miscible | miscible | miscible | miscible |
| 20 | slightly opaque | slightly opaque | miscible | miscible | miscible | miscible |
| 30 | slightly opaque | slightly opaque | miscible | miscible | miscible | miscible |
| 40 | slightly opaque | slightly opaque | miscible | miscible | miscible | miscible |
| 50 | slightly opaque | slightly opaque | miscible | miscible | slightly opaque | slightly opaque |
| 60 | slightly opaque | slightly opaque | miscible | miscible | slightly opaque | slightly opaque |
| 70 | slightly opaque | slightly opaque | miscible | miscible | slightly opaque | slightly opaque |
| 80 | Miscible | slightly opaque | miscible | Opaque 2 layers | Opaque 2 layers | Opaque |

Miscibility Results for Blend with YN12

| Temp | Lubricant Concentration wt % | | | | | |
|---|---|---|---|---|---|---|
| deg C. | 4 | 7 | 10 | 20 | 30 | 50 |
| −20 | Opaque | Opaque | Opaque | Opaque | Opaque | Opaque |
| −10 | Opaque | Opaque | Opaque | Opaque | slightly opaque | slightly opaque |
| 0 | Opaque | Opaque | slightly opaque | slightly opaque | slightly opaque | slightly opaque |
| 10 | Opaque | Opaque | slightly opaque | slightly opaque | slightly opaque | slightly opaque |
| 20 | Opaque | Opaque | slightly opaque | slightly opaque | slightly opaque | slightly opaque |
| 30 | slightly opaque | Opaque | slightly opaque | slightly opaque | slightly opaque | slightly opaque |
| 40 | slightly opaque | slightly opaque | slightly opaque | slightly opaque | slightly opaque | slightly opaque |
| 50 | very Slightly opaque | very Slightly opaque | slightly opaque | slightly opaque | slightly opaque | slightly opaque |
| 60 | very Slightly opaque | very Slightly opaque | slightly opaque | slightly opaque | slightly opaque | slightly opaque |
| 70 | very Slightly opaque | very Slightly opaque | 2 layers | 2 layers | 2 layers | slightly opaque |
| 80 | 2 layers | 2 layers | 2 layers | 2 layers | 2 layers | 2 layers |

Miscibility Results for 1234yf with YN12

| Temperature | Lubricant Concentration wt % | | | | | |
|---|---|---|---|---|---|---|
| deg C. | 4 | 7 | 10 | 20 | 30 | 50 |
| −20 | opaque | opaque | 2 layers | opaque | 2 layers | 2 layers |
| −10 | slightly opaque | slightly opaque | 2 layers | opaque | 2 layers | 2 layers |
| 0 | slightly opaque | opaque | 2 layers | opaque | opaque | opaque |
| 10 | slightly opaque | opaque | 2 layers opaque | 2 layers opaque | 2 layers opaque | 2 layers opaque |
| 20 | opaque | slightly opaque 2 layers | 2 layers opaque | 2 layers | 2 layers opaque | 2 layers opaque |
| 30 | opaque | opaque | 2 layers opaque | 2 layers | 2 layers opaque | 2 layers opaque |
| 40 | clear 2 layers | clear 2 layers | 2 layers clear | 2 layers | 2 layers clear | 2 layers clear |
| 50 | clear 2 layers | clear 2 layers | 2 layers clear | 2 layers | 2 layers clear | 2 layers clear |
| 60 | clear 2 layers | clear 2 layers | 2 layers clear | 2 layers | 2 layers clear | 2 layers clear |
| 70 | clear 2 layers | clear 2 layers | 2 layers clear | 2 layers | 2 layers clear | 2 layers clear |
| 80 | clear 2 layers | clear 2 layers | 2 layers clear | 2 layers | 2 layers clear | 2 layers clear |

The results show that the compositions of the invention have improved miscibility with lubricants compared to the pure fluid R-1234yf.

In summary, the invention provides new compositions that exhibit a surprising combination of advantageous properties including good refrigeration performance, low flammability, low GWP, and/or miscibility with lubricants compared to existing refrigerants such as R-134a and the proposed refrigerant R-1234yf.

The invention is defined by the following claims.

TABLE 1

Theoretical Performance Data of Selected R-744/R-32/R-1234ze(E) Blends Containing 2% R-744

| Composition $CO_2$/R-32/R-1234ze(E) percent by weight | | 2/0/98 | 2/2/96 | 2/4/94 | 2/6/92 | 2/8/90 | 2/10/88 | 2/12/86 |
|---|---|---|---|---|---|---|---|---|
| COP | | 2.55 | 2.56 | 2.57 | 2.57 | 2.58 | 2.59 | 2.59 |
| COP relative to Reference | | 104.5% | 104.8% | 105.1% | 105.4% | 105.6% | 105.9% | 106.0% |
| Volumetric capacity | $kJ/m^3$ | 1650 | 1750 | 1851 | 1951 | 2050 | 2148 | 2245 |
| Capacity relative to Reference | | 90.1% | 95.6% | 101.1% | 106.5% | 111.9% | 117.3% | 122.5% |
| Compressor discharge temperature | °C. | 83.6 | 85.2 | 86.7 | 88.1 | 89.4 | 90.7 | 91.9 |
| Evaporator inlet pressure | bar | 2.54 | 2.68 | 2.82 | 2.97 | 3.12 | 3.27 | 3.42 |
| Condenser inlet pressure | bar | 12.9 | 13.7 | 14.4 | 15.1 | 15.7 | 16.4 | 17.0 |
| Evaporator inlet temperature | °C. | 1.0 | 0.5 | 0.0 | −0.4 | −0.8 | −1.2 | −1.5 |
| Evaporator glide (out-in) | K | 2.0 | 3.0 | 4.0 | 4.9 | 5.7 | 6.4 | 7.0 |
| Compressor suction pressure | bar | 2.54 | 2.68 | 2.82 | 2.97 | 3.12 | 3.27 | 3.42 |
| Compressor discharge pressure | bar | 12.9 | 13.7 | 14.4 | 15.1 | 15.7 | 16.4 | 17.0 |
| Suction line pressure drop | Pa/m | 1944 | 1796 | 1668 | 1557 | 1460 | 1374 | 1298 |
| Pressure drop relative to reference | | 94.7% | 87.5% | 81.3% | 75.9% | 71.1% | 67.0% | 63.3% |
| Condenser exit liquid temperature | °C. | 46.5 | 45.7 | 45.1 | 44.7 | 44.3 | 44.1 | 43.9 |
| Condenser glide (in-out) | K | 7.0 | 8.6 | 9.7 | 10.6 | 11.3 | 11.8 | 12.2 |

TABLE 2

Theoretical Performance Data of Selected R-744/R-32/R-1234ze(E) Blends Containing 3% R-744

| Composition $CO_2$/R-32/R-1234ze(E) percent by weight | | 3/0/97 | 3/2/95 | 3/4/93 | 3/6/91 | 3/8/89 | 3/10/87 | 3/12/85 |
|---|---|---|---|---|---|---|---|---|
| COP | | 2.55 | 2.55 | 2.56 | 2.57 | 2.58 | 2.58 | 2.59 |
| COP relative to Reference | | 104.2% | 104.6% | 104.9% | 105.2% | 105.5% | 105.7% | 105.8% |
| Volumetric capacity | $kJ/m^3$ | 1741 | 1844 | 1946 | 2047 | 2146 | 2245 | 2341 |
| Capacity relative to Reference | | 95.1% | 100.7% | 106.2% | 111.7% | 117.2% | 122.6% | 127.8% |
| Compressor discharge temperature | °C. | 85.5 | 87.0 | 88.4 | 89.7 | 90.9 | 92.1 | 93.2 |
| Evaporator inlet pressure | bar | 2.65 | 2.80 | 2.95 | 3.10 | 3.25 | 3.41 | 3.56 |
| Condenser inlet pressure | bar | 13.8 | 14.5 | 15.2 | 15.9 | 16.5 | 17.2 | 17.8 |
| Evaporator inlet temperature | °C. | 0.4 | −0.1 | −0.5 | −1.0 | −1.3 | −1.7 | −2.0 |
| Evaporator glide (out-in) | K | 3.1 | 4.1 | 5.1 | 5.9 | 6.7 | 7.4 | 8.0 |
| Compressor suction pressure | bar | 2.65 | 2.80 | 2.95 | 3.10 | 3.25 | 3.41 | 3.56 |
| Compressor discharge pressure | bar | 13.8 | 14.5 | 15.2 | 15.9 | 16.5 | 17.2 | 17.8 |
| Suction line pressure drop | Pa/m | 1809 | 1678 | 1564 | 1465 | 1377 | 1299 | 1231 |
| Pressure drop relative to reference | | 88.1% | 81.8% | 76.2% | 71.4% | 67.1% | 63.3% | 60.0% |
| Condenser exit liquid temperature | °C. | 45.0 | 44.4 | 43.9 | 43.6 | 43.4 | 43.2 | 43.1 |
| Condenser glide (in-out) | K | 10.0 | 11.2 | 12.1 | 12.8 | 13.3 | 13.6 | 13.8 |

TABLE 3

Theoretical Performance Data of Selected R-744/R-32/R-1234ze(E) Blends Containing 4% R-744

| Composition $CO_2$/R-32/R-1234ze(E) percent by weight | | 4/0/96 | 4/2/94 | 4/4/92 | 4/6/90 | 4/8/88 | 4/10/86 |
|---|---|---|---|---|---|---|---|
| COP | | 2.54 | 2.55 | 2.56 | 2.57 | 2.57 | 2.58 |
| COP relative to Reference | | 104.0% | 104.4% | 104.8% | 105.1% | 105.3% | 105.5% |
| Volumetric capacity | $kJ/m^3$ | 1835 | 1939 | 2042 | 2144 | 2244 | 2343 |
| Capacity relative to Reference | | 100.2% | 105.9% | 111.5% | 117.0% | 122.5% | 127.9% |
| Compressor discharge temperature | °C. | 87.3 | 88.7 | 90.0 | 91.2 | 92.3 | 93.4 |
| Evaporator inlet pressure | bar | 2.78 | 2.93 | 3.08 | 3.24 | 3.39 | 3.55 |
| Condenser inlet pressure | bar | 14.6 | 15.3 | 16.0 | 16.7 | 17.3 | 18.0 |
| Evaporator inlet temperature | °C. | −0.1 | −0.6 | −1.1 | −1.5 | −1.8 | −2.2 |
| Evaporator glide (out-in) | K | 4.2 | 5.2 | 6.1 | 7.0 | 7.7 | 8.3 |
| Compressor suction pressure | bar | 2.78 | 2.93 | 3.08 | 3.24 | 3.39 | 3.55 |
| Compressor discharge pressure | bar | 14.6 | 15.3 | 16.0 | 16.7 | 17.3 | 18.0 |
| Suction line pressure drop | Pa/m | 1688 | 1572 | 1470 | 1381 | 1302 | 1232 |
| Pressure drop relative to reference | | 82.3% | 76.6% | 71.6% | 67.3% | 63.4% | 60.0% |
| Condenser exit liquid temperature | °C. | 43.7 | 43.2 | 42.9 | 42.6 | 42.5 | 42.4 |
| Condenser glide (in-out) | K | 12.6 | 13.6 | 14.2 | 14.7 | 15.0 | 15.2 |

TABLE 4

Theoretical Performance Data of Selected R-744/R-32/R-1234ze(E) Blends Containing 5% and 6% R-744

| Composition CO$_2$/R-32/R-1234ze(E) percent by weight | | 5/0/95 | 5/2/93 | 5/4/91 | 5/6/89 | 5/8/87 | 6/0/94 | 6/2/92 | 6/4/90 |
|---|---|---|---|---|---|---|---|---|---|
| COP | | 2.54 | 2.55 | 2.56 | 2.56 | 2.57 | 2.54 | 2.55 | 2.56 |
| COP relative to Reference | | 103.9% | 104.3% | 104.7% | 105.0% | 105.2% | 103.9% | 104.3% | 104.6% |
| Volumetric capacity | kJ/m$^3$ | 1931 | 2036 | 2140 | 2242 | 2343 | 2030 | 2135 | 2240 |
| Capacity relative to Reference | | 105.4% | 111.2% | 116.8% | 122.4% | 127.9% | 110.8% | 116.6% | 122.3% |
| Compressor discharge temperature | °C. | 88.9 | 90.2 | 91.4 | 92.5 | 93.6 | 90.5 | 91.6 | 92.7 |
| Evaporator inlet pressure | bar | 2.90 | 3.06 | 3.22 | 3.37 | 3.53 | 3.03 | 3.19 | 3.36 |
| Condenser inlet pressure | bar | 15.5 | 16.2 | 16.8 | 17.5 | 18.1 | 16.3 | 17.0 | 17.6 |
| Evaporator inlet temperature | °C. | 2.0 | 2.0 | 2.0 | 2.0 | 2.0 | 2.0 | 2.0 | 2.0 |
| Evaporator glide (out-in) | K | 5.3 | 6.3 | 7.2 | 8.0 | 8.7 | 6.5 | 7.4 | 8.3 |
| Compressor suction pressure | bar | 2.90 | 3.06 | 3.22 | 3.37 | 3.53 | 3.03 | 3.19 | 3.36 |
| Compressor discharge pressure | bar | 15.5 | 16.2 | 16.8 | 17.5 | 18.1 | 16.3 | 17.0 | 17.6 |
| Suction line pressure drop | Pa/m | 1580 | 1476 | 1385 | 1304 | 1233 | 1483 | 1390 | 1308 |
| Pressure drop relative to reference | | 77.0% | 71.9% | 67.5% | 63.6% | 60.1% | 72.3% | 67.7% | 63.7% |
| Condenser exit liquid temperature | | 42.5 | 42.2 | 41.9 | 41.8 | 41.7 | 41.4 | 41.2 | 41.1 |
| Condenser glide (in-out) | K | 15.0 | 15.7 | 16.1 | 16.4 | 16.6 | 17.1 | 17.6 | 17.9 |

TABLE 5

Theoretical Performance Data of Selected R-744/R-152a/R-1234ze(E) Blends Containing 2% R-744

| Composition CO$_2$/R-152a/R-1234ze(E) percent by weight | | 2/0/98 | 2/2/96 | 2/4/94 | 2/6/92 | 2/8/90 | 2/10/88 | 2/12/86 | 2/14/84 | 2/16/82 | 2/18/80 | 2/20/78 |
|---|---|---|---|---|---|---|---|---|---|---|---|---|
| COP | | 2.55 | 2.56 | 2.56 | 2.56 | 2.57 | 2.57 | 2.58 | 2.58 | 2.58 | 2.58 | 2.59 |
| COP relative to Ref | | 104.5% | 104.7% | 104.8% | 105.0% | 105.1% | 105.3% | 105.4% | 105.5% | 105.7% | 105.8% | 105.9% |
| Volumetric capacity | kJ/m$^3$ | 1650 | 1665 | 1680 | 1694 | 1708 | 1721 | 1734 | 1747 | 1760 | 1772 | 1783 |
| Capacity relative to Ref | | 90.1% | 90.9% | 91.7% | 92.5% | 93.2% | 94.0% | 94.7% | 95.4% | 96.1% | 96.7% | 97.4% |
| Compressor discharge T | °C. | 83.6 | 84.1 | 84.7 | 85.2 | 85.8 | 86.3 | 86.9 | 87.4 | 88.0 | 88.5 | 89.0 |
| Evaporator inlet P | bar | 2.54 | 2.56 | 2.58 | 2.59 | 2.61 | 2.63 | 2.64 | 2.66 | 2.68 | 2.69 | 2.70 |
| Condenser inlet P | bar | 12.9 | 13.0 | 13.1 | 13.1 | 13.2 | 13.3 | 13.3 | 13.4 | 13.4 | 13.5 | 13.5 |
| Evaporator inlet T | °C. | 1.0 | 1.0 | 1.0 | 1.0 | 1.0 | 1.0 | 1.0 | 1.0 | 1.0 | 1.0 | 1.0 |
| Evaporator glide (out-in) | K | 2.0 | 2.0 | 2.1 | 2.1 | 2.1 | 2.1 | 2.1 | 2.1 | 2.1 | 2.1 | 2.0 |
| Compressor suction P | bar | 2.54 | 2.56 | 2.58 | 2.59 | 2.61 | 2.63 | 2.64 | 2.66 | 2.68 | 2.69 | 2.70 |
| Compressor discharge P | bar | 12.9 | 13.0 | 13.1 | 13.1 | 13.2 | 13.3 | 13.3 | 13.4 | 13.4 | 13.5 | 13.5 |
| Suction line pressure drop | Pa/m | 1944 | 1904 | 1866 | 1829 | 1795 | 1761 | 1729 | 1699 | 1669 | 1641 | 1614 |
| Pressure drop relative to reference | | 94.7% | 92.8% | 90.9% | 89.2% | 87.5% | 85.8% | 84.3% | 82.8% | 81.3% | 80.0% | 78.6% |
| Condenser exit liquid T | °C. | 46.5 | 46.5 | 46.6 | 46.6 | 46.7 | 46.7 | 46.7 | 46.8 | 46.8 | 46.9 | 46.9 |
| Condenser glide (in-out) | K | 7.0 | 6.9 | 6.9 | 6.8 | 6.7 | 6.6 | 6.5 | 6.4 | 6.3 | 6.3 | 6.2 |

TABLE 6

Theoretical Performance Data of Selected R-744/R-152a/R-1234ze(E) Blends Containing 3% R-744

| Composition CO$_2$/R-152a/R-1234ze(E) percent by weight | | 3/0/97 | 3/2/95 | 3/4/93 | 3/6/91 | 3/8/89 | 3/10/87 | 3/12/85 | 3/14/83 | 3/16/81 | 3/18/79 | 3/20/77 |
|---|---|---|---|---|---|---|---|---|---|---|---|---|
| COP | | 2.55 | 2.55 | 2.55 | 2.56 | 2.56 | 2.56 | 2.57 | 2.57 | 2.57 | 2.58 | 2.58 |
| COP relative to Ref | | 104.2% | 104.4% | 104.5% | 104.7% | 104.8% | 104.9% | 105.1% | 105.2% | 105.3% | 105.4% | 105.6% |
| Volumetric capacity | kJ/m$^3$ | 1741 | 1756 | 1770 | 1784 | 1797 | 1810 | 1823 | 1835 | 1846 | 1858 | 1869 |
| Capacity relative to Ref | | 95.1% | 95.9% | 96.6% | 97.4% | 98.1% | 98.8% | 99.5% | 100.2% | 100.8% | 101.4% | 102.0% |
| Compressor discharge T | °C. | 85.5 | 86.1 | 86.6 | 87.1 | 87.7 | 88.2 | 88.7 | 89.3 | 89.8 | 90.3 | 90.8 |
| Evaporator inlet P | bar | 2.65 | 2.67 | 2.69 | 2.71 | 2.72 | 2.74 | 2.76 | 2.77 | 2.79 | 2.80 | 2.81 |
| Condenser inlet P | bar | 13.8 | 13.8 | 13.9 | 14.0 | 14.0 | 14.1 | 14.1 | 14.2 | 14.2 | 14.3 | 14.3 |
| Evaporator inlet T | °C. | 0.4 | 0.4 | 0.4 | 0.4 | 0.4 | 0.5 | 0.5 | 0.5 | 0.5 | 0.5 | 0.5 |
| Evaporator glide (out-in) | K | 3.1 | 3.1 | 3.1 | 3.1 | 3.1 | 3.1 | 3.1 | 3.1 | 3.1 | 3.0 | 3.0 |
| Compressor suction P | bar | 2.65 | 2.67 | 2.69 | 2.71 | 2.72 | 2.74 | 2.76 | 2.77 | 2.79 | 2.80 | 2.81 |
| Compressor discharge P | bar | 13.8 | 13.8 | 13.9 | 14.0 | 14.0 | 14.1 | 14.1 | 14.2 | 14.2 | 14.3 | 14.3 |
| Suction line pressure drop | Pa/m | 1809 | 1774 | 1740 | 1708 | 1678 | 1648 | 1620 | 1593 | 1567 | 1541 | 1517 |
| Pressure drop relative to reference | | 88.1% | 86.4% | 84.8% | 83.3% | 81.8% | 80.3% | 78.9% | 77.6% | 76.3% | 75.1% | 73.9% |
| Condenser exit liquid T | °C. | 45.0 | 45.1 | 45.1 | 45.2 | 45.3 | 45.3 | 45.4 | 45.5 | 45.5 | 45.6 | 45.6 |
| Condenser glide (in-out) | K | 10.0 | 9.9 | 9.7 | 9.6 | 9.5 | 9.3 | 9.2 | 9.1 | 9.0 | 8.9 | 8.7 |

TABLE 7

Theoretical Performance Data of Selected R-744/R-152a/R-1234ze(E) Blends Containing 4% R-744

| Composition $CO_2$/R-152a/ R-1234ze(E) percent by weight | | 4/0/96 | 4/2/94 | 4/4/92 | 4/6/90 | 4/8/88 | 4/10/86 | 4/12/84 | 4/14/82 | 4/16/80 | 4/18/78 | 4/20/76 |
|---|---|---|---|---|---|---|---|---|---|---|---|---|
| COP | | 2.54 | 2.55 | 2.55 | 2.55 | 2.56 | 2.56 | 2.56 | 2.56 | 2.57 | 2.57 | 2.57 |
| COP relative to Ref | | 104.0% | 104.2% | 104.3% | 104.5% | 104.6% | 104.7% | 104.8% | 105.0% | 105.1% | 105.2% | 105.3% |
| Volumetric capacity | kJ/m³ | 1835 | 1849 | 1863 | 1876 | 1889 | 1901 | 1913 | 1924 | 1935 | 1946 | 1957 |
| Capacity relative to Ref | | 100.2% | 101.0% | 101.7% | 102.4% | 103.1% | 103.8% | 104.4% | 105.1% | 105.7% | 106.3% | 106.8% |
| Compressor discharge T | ° C. | 87.3 | 87.8 | 88.4 | 88.9 | 89.4 | 89.9 | 90.4 | 91.0 | 91.5 | 92.0 | 92.5 |
| Evaporator inlet P | bar | 2.78 | 2.79 | 2.81 | 2.83 | 2.84 | 2.86 | 2.87 | 2.89 | 2.90 | 2.92 | 2.93 |
| Condenser inlet P | bar | 14.6 | 14.7 | 14.7 | 14.8 | 14.8 | 14.9 | 14.9 | 15.0 | 15.0 | 15.1 | 15.1 |
| Evaporator inlet T | ° C. | 2.0 | 2.0 | 2.0 | 2.0 | 2.0 | 2.0 | 2.0 | 2.0 | 2.0 | 2.0 | 2.0 |
| Evaporator glide (out-in) | K | 4.2 | 4.2 | 4.2 | 4.2 | 4.2 | 4.1 | 4.1 | 4.1 | 4.1 | 4.1 | 4.0 |
| Compressor suction P | bar | 2.78 | 2.79 | 2.81 | 2.83 | 2.84 | 2.86 | 2.87 | 2.89 | 2.90 | 2.92 | 2.93 |
| Compressor discharge P | bar | 14.6 | 14.7 | 14.7 | 14.8 | 14.8 | 14.9 | 14.9 | 15.0 | 15.0 | 15.1 | 15.1 |
| Suction line pressure drop | Pa/m | 1688 | 1657 | 1628 | 1600 | 1572 | 1546 | 1521 | 1497 | 1474 | 1451 | 1430 |
| Pressure drop relative to reference | | 82.3% | 80.8% | 79.3% | 78.0% | 76.6% | 75.4% | 74.1% | 73.0% | 71.8% | 70.7% | 69.7% |
| Condenser exit liquid T | ° C. | 43.7 | 43.8 | 43.9 | 43.9 | 44.0 | 44.1 | 44.2 | 44.3 | 44.3 | 44.4 | 44.5 |
| Condenser glide (in-out) | K | 12.6 | 12.5 | 12.3 | 12.1 | 12.0 | 11.8 | 11.7 | 11.5 | 11.4 | 11.2 | 11.1 |

TABLE 8

Theoretical Performance Data of Selected R-744/R-152a/R-1234ze(E) Blends Containing 5% R-744

| Composition $CO_2$/R-152a/ R-1234ze(E) percent by weight | | 5/0/95 | 5/2/93 | 5/4/91 | 5/6/89 | 5/8/87 | 5/10/85 | 5/12/83 | 5/14/81 | 5/16/79 | 5/18/77 | 5/20/75 |
|---|---|---|---|---|---|---|---|---|---|---|---|---|
| COP | | 2.54 | 2.54 | 2.55 | 2.55 | 2.55 | 2.55 | 2.56 | 2.56 | 2.56 | 2.56 | 2.57 |
| COP relative to Ref | | 103.9% | 104.1% | 104.2% | 104.3% | 104.4% | 104.6% | 104.7% | 104.8% | 104.9% | 105.0% | 105.1% |
| Volumetric capacity | kJ/m³ | 1931 | 1945 | 1958 | 1970 | 1982 | 1994 | 2005 | 2016 | 2026 | 2037 | 2047 |
| Capacity relative to Ref | | 105.4% | 106.2% | 106.9% | 107.6% | 108.2% | 108.8% | 109.5% | 110.1% | 110.6% | 111.2% | 111.7% |
| Compressor discharge T | ° C. | 88.9 | 89.5 | 90.0 | 90.5 | 91.0 | 91.5 | 92.0 | 92.5 | 93.0 | 93.5 | 94.0 |
| Evaporator inlet P | bar | 2.90 | 2.92 | 2.94 | 2.95 | 2.97 | 2.98 | 3.00 | 3.01 | 3.02 | 3.04 | 3.05 |
| Condenser inlet P | bar | 15.5 | 15.5 | 15.6 | 15.6 | 15.6 | 15.7 | 15.7 | 15.8 | 15.8 | 15.8 | 15.9 |
| Evaporator inlet T | ° C. | 2.0 | 2.0 | 2.0 | 2.0 | 2.0 | 2.0 | 2.0 | 2.0 | 2.0 | 2.0 | 2.0 |
| Evaporator glide (out-in) | K | 5.3 | 5.3 | 5.3 | 5.3 | 5.2 | 5.2 | 5.2 | 5.1 | 5.1 | 5.1 | 5.0 |
| Compressor suction P | bar | 2.90 | 2.92 | 2.94 | 2.95 | 2.97 | 2.98 | 3.00 | 3.01 | 3.02 | 3.04 | 3.05 |
| Compressor discharge P | bar | 15.5 | 15.5 | 15.6 | 15.6 | 15.6 | 15.7 | 15.7 | 15.8 | 15.8 | 15.8 | 15.9 |
| Suction line pressure drop | Pa/m | 1580 | 1553 | 1527 | 1502 | 1478 | 1454 | 1432 | 1410 | 1389 | 1369 | 1350 |
| Pressure drop relative to reference | | 77.0% | 75.7% | 74.4% | 73.2% | 72.0% | 70.9% | 69.8% | 68.7% | 67.7% | 66.7% | 65.8% |
| Condenser exit liquid T | ° C. | 42.5 | 42.6 | 42.7 | 42.8 | 42.9 | 43.0 | 43.1 | 43.2 | 43.2 | 43.3 | 43.4 |
| Condenser glide (in-out) | K | 15.0 | 14.8 | 14.6 | 14.4 | 14.2 | 14.0 | 13.8 | 13.7 | 13.5 | 13.3 | 13.2 |

TABLE 9

Theoretical Performance Data of Selected R-744/R-161/R-1234ze(E) Blends Containing 2% R-744

| Composition $CO_2$/R-161/ R-1234ze(E) percent by weight | | 2/0/98 | 2/2/96 | 2/4/94 | 2/6/92 | 2/8/90 | 2/10/88 |
|---|---|---|---|---|---|---|---|
| COP | | 2.55 | 2.56 | 2.57 | 2.58 | 2.59 | 2.60 |
| COP relative to Reference | | 104.5% | 104.9% | 105.3% | 105.6% | 106.0% | 106.3% |
| Volumetric capacity | kJ/m³ | 1650 | 1692 | 1735 | 1777 | 1818 | 1859 |
| Capacity relative to Reference | | 90.1% | 92.4% | 94.7% | 97.0% | 99.3% | 101.5% |
| Compressor discharge temperature | ° C. | 83.6 | 84.4 | 85.3 | 86.1 | 86.9 | 87.7 |
| Evaporator inlet pressure | bar | 2.54 | 2.60 | 2.65 | 2.71 | 2.77 | 2.83 |
| Condenser inlet pressure | bar | 12.9 | 13.2 | 13.4 | 13.6 | 13.8 | 14.1 |
| Evaporator inlet temperature | ° C. | 1.0 | 0.9 | 0.8 | 0.7 | 0.6 | 0.6 |
| Evaporator glide (out-in) | K | 2.0 | 2.2 | 2.4 | 2.5 | 2.7 | 2.9 |
| Compressor suction pressure | bar | 2.54 | 2.60 | 2.65 | 2.71 | 2.77 | 2.83 |
| Compressor discharge pressure | bar | 12.9 | 13.2 | 13.4 | 13.6 | 13.8 | 14.1 |
| Suction line pressure drop | Pa/m | 1944 | 1853 | 1770 | 1693 | 1623 | 1558 |
| Pressure drop relative to reference | | 94.7% | 90.3% | 86.3% | 82.5% | 79.1% | 75.9% |
| Condenser exit liquid temperature | ° C. | 46.5 | 46.5 | 46.4 | 46.4 | 46.4 | 46.4 |
| Condenser glide (in-out) | K | 7.0 | 7.1 | 7.1 | 7.2 | 7.2 | 7.2 |

TABLE 10

Theoretical Performance Data of Selected R-744/R-161/R-1234ze(E) Blends Containing 3% R-744

| Composition CO$_2$/R-161/ R-1234ze(E) percent by weight | | 3/0/97 | 3/2/95 | 3/4/93 | 3/6/91 | 3/8/89 | 3/10/87 |
|---|---|---|---|---|---|---|---|
| COP | | 2.55 | 2.56 | 2.57 | 2.57 | 2.58 | 2.59 |
| COP relative to Reference | | 104.2% | 104.6% | 105.0% | 105.3% | 105.7% | 105.9% |
| Volumetric capacity | kJ/m$^3$ | 1741 | 1784 | 1826 | 1868 | 1909 | 1949 |
| Capacity relative to Reference | | 95.1% | 97.4% | 99.7% | 102.0% | 104.2% | 106.4% |
| Compressor discharge temperature | °C. | 85.5 | 86.3 | 87.2 | 87.9 | 88.7 | 89.4 |
| Evaporator inlet pressure | bar | 2.65 | 2.71 | 2.77 | 2.83 | 2.89 | 2.94 |
| Condenser inlet pressure | bar | 13.8 | 14.0 | 14.2 | 14.4 | 14.6 | 14.9 |
| Evaporator inlet temperature | °C. | 0.4 | 0.4 | 0.3 | 0.2 | 0.1 | 0.1 |
| Evaporator glide (out-in) | K | 3.1 | 3.3 | 3.4 | 3.6 | 3.7 | 3.9 |
| Compressor suction pressure | bar | 2.65 | 2.71 | 2.77 | 2.83 | 2.89 | 2.94 |
| Compressor discharge pressure | bar | 13.8 | 14.0 | 14.2 | 14.4 | 14.6 | 14.9 |
| Suction line pressure drop | Pa/m | 1809 | 1728 | 1654 | 1586 | 1523 | 1465 |
| Pressure drop relative to reference | | 88.1% | 84.2% | 80.6% | 77.3% | 74.2% | 71.4% |
| Condenser exit liquid temperature | °C. | 45.0 | 45.0 | 45.0 | 45.1 | 45.1 | 45.2 |
| Condenser glide (in-out) | K | 10.0 | 10.0 | 9.9 | 9.8 | 9.8 | 9.7 |

TABLE 11

Theoretical Performance Data of Selected R-744/R-161/R-1234ze(E) Blends Containing 4% R-744

| Composition CO$_2$/R-161/ R-1234ze(E) percent by weight | | 4/0/96 | 4/2/94 | 4/4/92 | 4/6/90 | 4/8/88 | 4/10/86 |
|---|---|---|---|---|---|---|---|
| COP | | 2.54 | 2.55 | 2.56 | 2.57 | 2.58 | 2.58 |
| COP relative to Reference | | 104.0% | 104.4% | 104.8% | 105.1% | 105.4% | 105.7% |
| Volumetric capacity | kJ/m$^3$ | 1835 | 1878 | 1919 | 1961 | 2001 | 2041 |
| Capacity relative to Reference | | 100.2% | 102.5% | 104.8% | 107.0% | 109.3% | 111.4% |
| Compressor discharge temperature | °C. | 87.3 | 88.1 | 88.9 | 89.6 | 90.3 | 91.0 |
| Evaporator inlet pressure | bar | 2.78 | 2.83 | 2.89 | 2.95 | 3.01 | 3.07 |
| Condenser inlet pressure | bar | 14.6 | 14.8 | 15.0 | 15.2 | 15.4 | 15.6 |
| Evaporator inlet temperature | °C. | -0.1 | -0.2 | -0.3 | -0.3 | -0.4 | -0.4 |
| Evaporator glide (out-in) | K | 4.2 | 4.4 | 4.5 | 4.6 | 4.8 | 4.9 |
| Compressor suction pressure | bar | 2.78 | 2.83 | 2.89 | 2.95 | 3.01 | 3.07 |
| Compressor discharge pressure | bar | 14.6 | 14.8 | 15.0 | 15.2 | 15.4 | 15.6 |
| Suction line pressure drop | Pa/m | 1688 | 1616 | 1550 | 1489 | 1433 | 1380 |
| Pressure drop relative to reference | | 82.3% | 78.8% | 75.5% | 72.6% | 69.8% | 67.3% |
| Condenser exit liquid temperature | °C. | 43.7 | 43.7 | 43.8 | 43.9 | 43.9 | 44.0 |
| Condenser glide (in-out) | K | 12.6 | 12.5 | 12.4 | 12.3 | 12.1 | 11.9 |

TABLE 12

Theoretical Performance Data of Selected R-744/R-161/R-1234ze(E) Blends Containing 5% R-744

| Composition CO$_2$/R-161/ R-1234ze(E) percent by weight | | 5/0/95 | 5/2/93 | 5/4/91 | 5/6/89 | 5/8/87 | 5/10/85 |
|---|---|---|---|---|---|---|---|
| COP | | 2.54 | 2.55 | 2.56 | 2.56 | 2.57 | 2.58 |
| COP relative to Reference | | 103.9% | 104.3% | 104.7% | 105.0% | 105.3% | 105.6% |
| Volumetric capacity | kJ/m$^3$ | 1931 | 1973 | 2015 | 2055 | 2095 | 2135 |
| Capacity relative to Reference | | 105.4% | 107.7% | 110.0% | 112.2% | 114.4% | 116.5% |
| Compressor discharge temperature | °C. | 88.9 | 89.7 | 90.4 | 91.1 | 91.8 | 92.5 |
| Evaporator inlet pressure | bar | 2.90 | 2.96 | 3.02 | 3.08 | 3.14 | 3.19 |
| Condenser inlet pressure | bar | 15.5 | 15.7 | 15.9 | 16.1 | 16.2 | 16.4 |
| Evaporator inlet temperature | °C. | -0.7 | -0.7 | -0.8 | -0.9 | -0.9 | -0.9 |
| Evaporator glide (out-in) | K | 5.3 | 5.5 | 5.6 | 5.7 | 5.8 | 5.9 |
| Compressor suction pressure | bar | 2.90 | 2.96 | 3.02 | 3.08 | 3.14 | 3.19 |
| Compressor discharge pressure | bar | 15.5 | 15.7 | 15.9 | 16.1 | 16.2 | 16.4 |
| Suction line pressure drop | Pa/m | 1580 | 1516 | 1456 | 1402 | 1351 | 1304 |
| Pressure drop relative to reference | | 77.0% | 73.9% | 71.0% | 68.3% | 65.8% | 63.5% |
| Condenser exit liquid temperature | °C. | 42.5 | 42.6 | 42.7 | 42.8 | 42.9 | 43.0 |
| Condenser glide (in-out) | K | 15.0 | 14.8 | 14.6 | 14.4 | 14.2 | 14.0 |

TABLE 13

Theoretical Performance Data of Selected R-744/R-134a/R-1234ze(E)
Blends Containing 2% R-744 and up to 15% R-134a

| Composition $CO_2$/R-134a/ R-1234ze(E) percent by weight | | 2/0/98 | 2/2/96 | 2/4/94 | 2/6/92 | 2/8/90 | 2/10/88 | 2/15/83 |
|---|---|---|---|---|---|---|---|---|
| COP | | 2.55 | 2.55 | 2.55 | 2.55 | 2.55 | 2.55 | 2.55 |
| COP relative to Reference | | 104.5% | 104.5% | 104.5% | 104.5% | 104.5% | 104.5% | 104.5% |
| Volumetric capacity | $kJ/m^3$ | 1650 | 1665 | 1680 | 1695 | 1710 | 1725 | 1760 |
| Capacity relative to Reference | | 90.1% | 90.9% | 91.7% | 92.6% | 93.4% | 94.2% | 96.1% |
| Refrigeration effect | kJ/kg | 131.3 | 131.5 | 131.7 | 131.9 | 132.0 | 132.2 | 132.7 |
| Pressure ratio | | 5.09 | 5.09 | 5.08 | 5.07 | 5.06 | 5.06 | 5.04 |
| Refrigerant mass flow | kg/hr | 178.3 | 178.0 | 177.7 | 177.5 | 177.2 | 177.0 | 176.4 |
| Compressor discharge temperature | °C. | 83.6 | 83.7 | 83.9 | 84.0 | 84.2 | 84.4 | 84.8 |
| Evaporator inlet pressure | bar | 2.54 | 2.56 | 2.59 | 2.61 | 2.64 | 2.66 | 2.72 |
| Condenser inlet pressure | bar | 12.9 | 13.0 | 13.1 | 13.3 | 13.4 | 13.5 | 13.7 |
| Evaporator inlet temperature | °C. | 1.0 | 1.0 | 0.9 | 0.9 | 0.9 | 0.9 | 0.8 |
| Evaporator dewpoint | °C. | 3.0 | 3.0 | 3.1 | 3.1 | 3.1 | 3.1 | 3.2 |
| Evaporator exit gas temperature | °C. | 13.0 | 13.0 | 13.1 | 13.1 | 13.1 | 13.1 | 13.2 |
| Evaporator mean temperature | °C. | 2.0 | 2.0 | 2.0 | 2.0 | 2.0 | 2.0 | 2.0 |
| Evaporator glide (out-in) | K | 2.0 | 2.1 | 2.1 | 2.2 | 2.2 | 2.3 | 2.3 |
| Compressor suction pressure | bar | 2.54 | 2.56 | 2.59 | 2.61 | 2.64 | 2.66 | 2.72 |
| Compressor discharge pressure | bar | 12.9 | 13.0 | 13.1 | 13.3 | 13.4 | 13.5 | 13.7 |
| Suction line pressure drop | Pa/m | 1944 | 1924 | 1904 | 1885 | 1867 | 1849 | 1807 |
| Pressure drop relative to reference | | 94.7% | 93.7% | 92.8% | 91.9% | 91.0% | 90.1% | 88.1% |
| Condenser dew point | °C. | 58.5 | 58.5 | 58.5 | 58.5 | 58.5 | 58.5 | 58.4 |
| Condenser bubble point | °C. | 51.5 | 51.5 | 51.5 | 51.5 | 51.5 | 51.5 | 51.6 |
| Condenser exit liquid temperature | °C. | 46.5 | 46.5 | 46.5 | 46.5 | 46.5 | 46.5 | 46.6 |
| Condenser mean temperature | °C. | 55.0 | 55.0 | 55.0 | 55.0 | 55.0 | 55.0 | 55.0 |
| Condenser glide (in-out) | K | 7.0 | 7.0 | 7.0 | 7.0 | 7.0 | 7.0 | 6.9 |

TABLE 14

Theoretical Performance Data of Selected R-744/R-134a/R-1234ze(E)
Blends Containing 2% R-744 and 20-45% R-134a

| Composition $CO_2$/R-134a/ R-1234ze(E) percent by weight | | 2/20/78 | 2/25/73 | 2/30/68 | 2/35/63 | 2/40/58 | 2/45/53 |
|---|---|---|---|---|---|---|---|
| COP | | 2.55 | 2.55 | 2.55 | 2.55 | 2.55 | 2.55 |
| COP relative to Reference | | 104.5% | 104.4% | 104.4% | 104.3% | 104.3% | 104.2% |
| Volumetric capacity | $kJ/m^3$ | 1795 | 1828 | 1860 | 1891 | 1921 | 1949 |
| Capacity relative to Reference | | 98.0% | 99.8% | 101.6% | 103.2% | 104.9% | 106.4% |
| Refrigeration effect | kJ/kg | 133.1 | 133.5 | 134.0 | 134.4 | 134.9 | 135.3 |
| Pressure ratio | | 5.03 | 5.01 | 5.00 | 4.98 | 4.97 | 4.96 |
| Refrigerant mass flow | kg/hr | 175.8 | 175.2 | 174.7 | 174.1 | 173.5 | 172.9 |
| Compressor discharge temperature | °C. | 85.2 | 85.6 | 86.0 | 86.4 | 86.8 | 87.3 |
| Evaporator inlet pressure | bar | 2.78 | 2.83 | 2.89 | 2.94 | 2.99 | 3.04 |
| Condenser inlet pressure | bar | 14.0 | 14.2 | 14.4 | 14.7 | 14.9 | 15.1 |
| Evaporator inlet temperature | °C. | 0.8 | 0.8 | 0.8 | 0.8 | 0.9 | 0.9 |
| Evaporator dewpoint | °C. | 3.2 | 3.2 | 3.2 | 3.2 | 3.1 | 3.1 |
| Evaporator exit gas temperature | °C. | 13.2 | 13.2 | 13.2 | 13.2 | 13.1 | 13.1 |
| Evaporator mean temperature | °C. | 2.0 | 2.0 | 2.0 | 2.0 | 2.0 | 2.0 |
| Evaporator glide (out-in) | K | 2.4 | 2.4 | 2.4 | 2.3 | 2.3 | 2.2 |
| Compressor suction pressure | bar | 2.78 | 2.83 | 2.89 | 2.94 | 2.99 | 3.04 |
| Compressor discharge pressure | bar | 14.0 | 14.2 | 14.4 | 14.7 | 14.9 | 15.1 |
| Suction line pressure drop | Pa/m | 1768 | 1732 | 1698 | 1666 | 1636 | 1608 |
| Pressure drop relative to reference | | 86.2% | 84.4% | 82.7% | 81.2% | 79.7% | 78.4% |
| Condenser dew point | °C. | 58.4 | 58.3 | 58.3 | 58.2 | 58.1 | 58.0 |
| Condenser bubble point | °C. | 51.6 | 51.7 | 51.7 | 51.8 | 51.9 | 52.0 |
| Condenser exit liquid temperature | °C. | 46.6 | 46.7 | 46.7 | 46.8 | 46.9 | 47.0 |
| Condenser mean temperature | °C. | 55.0 | 55.0 | 55.0 | 55.0 | 55.0 | 55.0 |
| Condenser glide (in-out) | K | 6.8 | 6.7 | 6.5 | 6.4 | 6.2 | 6.0 |

TABLE 15

Theoretical Performance Data of Selected R-744/R-134a/R-1234ze(E) Blends Containing 3% R-744 and up to 15% R-134a

| Composition CO$_2$/R-134a/ R-1234ze(E) percent by weight | | 3/0/97 | 3/2/95 | 3/4/93 | 3/6/91 | 3/8/89 | 3/10/87 | 3/15/82 |
|---|---|---|---|---|---|---|---|---|
| COP | | 2.55 | 2.55 | 2.55 | 2.55 | 2.55 | 2.55 | 2.55 |
| COP relative to Reference | | 104.2% | 104.2% | 104.2% | 104.2% | 104.2% | 104.2% | 104.2% |
| Volumetric capacity | kJ/m³ | 1741 | 1757 | 1772 | 1787 | 1802 | 1817 | 1853 |
| Capacity relative to Reference | | 95.1% | 95.9% | 96.8% | 97.6% | 98.4% | 99.2% | 101.2% |
| Refrigeration effect | kJ/kg | 134.5 | 134.6 | 134.8 | 134.9 | 135.1 | 135.2 | 135.6 |
| Pressure ratio | | 5.19 | 5.18 | 5.17 | 5.16 | 5.15 | 5.15 | 5.12 |
| Refrigerant mass flow | kg/hr | 174.0 | 173.8 | 173.6 | 173.4 | 173.2 | 173.0 | 172.6 |
| Compressor discharge temperature | °C. | 85.5 | 85.7 | 85.8 | 85.9 | 86.1 | 86.2 | 86.6 |
| Evaporator inlet pressure | bar | 2.65 | 2.68 | 2.71 | 2.73 | 2.76 | 2.78 | 2.84 |
| Condenser inlet pressure | bar | 13.8 | 13.9 | 14.0 | 14.1 | 14.2 | 14.3 | 14.6 |
| Evaporator inlet temperature | °C. | 0.4 | 0.4 | 0.4 | 0.4 | 0.4 | 0.3 | 0.3 |
| Evaporator dewpoint | °C. | 3.6 | 3.6 | 3.6 | 3.6 | 3.6 | 3.7 | 3.7 |
| Evaporator exit gas temperature | °C. | 13.6 | 13.6 | 13.6 | 13.6 | 13.6 | 13.7 | 13.7 |
| Evaporator mean temperature | °C. | 2.0 | 2.0 | 2.0 | 2.0 | 2.0 | 2.0 | 2.0 |
| Evaporator glide (out-in) | K | 3.1 | 3.2 | 3.2 | 3.2 | 3.3 | 3.3 | 3.4 |
| Compressor suction pressure | bar | 2.65 | 2.68 | 2.71 | 2.73 | 2.76 | 2.78 | 2.84 |
| Compressor discharge pressure | bar | 13.8 | 13.9 | 14.0 | 14.1 | 14.2 | 14.3 | 14.6 |
| Suction line pressure drop | Pa/m | 1809 | 1791 | 1774 | 1757 | 1741 | 1725 | 1688 |
| Pressure drop relative to reference | | 88.1% | 87.3% | 86.4% | 85.6% | 84.9% | 84.1% | 82.3% |
| Condenser dew point | °C. | 60.0 | 60.0 | 60.0 | 59.9 | 59.9 | 59.9 | 59.8 |
| Condenser bubble point | °C. | 50.0 | 50.0 | 50.0 | 50.1 | 50.1 | 50.1 | 50.2 |
| Condenser exit liquid temperature | °C. | 45.0 | 45.0 | 45.0 | 45.1 | 45.1 | 45.1 | 45.2 |
| Condenser mean temperature | °C. | 55.0 | 55.0 | 55.0 | 55.0 | 55.0 | 55.0 | 55.0 |
| Condenser glide (in-out) | K | 10.0 | 10.0 | 9.9 | 9.9 | 9.8 | 9.7 | 9.6 |

TABLE 16

Theoretical Performance Data of Selected R-744/R-134a/R-1234ze(E) Blends Containing 3% R-744 and 20-45% R-134a

| Composition CO$_2$/R-134a/R-1234ze(E) percent by weight | | 3/20/77 | 3/25/72 | 3/30/67 | 3/35/62 | 3/40/57 | 3/45/52 |
|---|---|---|---|---|---|---|---|
| COP | | 2.54 | 2.54 | 2.54 | 2.54 | 2.54 | 2.54 |
| COP relative to Reference | | 104.2% | 104.1% | 104.1% | 104.0% | 103.9% | 103.9% |
| Volumetric capacity | kJ/m³ | 1888 | 1922 | 1954 | 1985 | 2015 | 2044 |
| Capacity relative to Reference | | 103.1% | 104.9% | 106.7% | 108.4% | 110.0% | 111.6% |
| Refrigeration effect | kJ/kg | 136.0 | 136.3 | 136.7 | 137.1 | 137.5 | 137.9 |
| Pressure ratio | | 5.10 | 5.09 | 5.07 | 5.05 | 5.04 | 5.02 |
| Refrigerant mass flow | kg/hr | 172.1 | 171.6 | 171.2 | 170.7 | 170.2 | 169.6 |
| Compressor discharge temperature | °C. | 87.0 | 87.4 | 87.8 | 88.2 | 88.6 | 89.0 |
| Evaporator inlet pressure | bar | 2.90 | 2.96 | 3.01 | 3.07 | 3.12 | 3.17 |
| Condenser inlet pressure | bar | 14.8 | 15.0 | 15.3 | 15.5 | 15.7 | 15.9 |
| Evaporator inlet temperature | °C. | 0.3 | 0.3 | 0.3 | 0.4 | 0.4 | 0.4 |
| Evaporator dewpoint | °C. | 3.7 | 3.7 | 3.7 | 3.6 | 3.6 | 3.6 |
| Evaporator exit gas temperature | °C. | 13.7 | 13.7 | 13.7 | 13.6 | 13.6 | 13.6 |
| Evaporator mean temperature | °C. | 2.0 | 2.0 | 2.0 | 2.0 | 2.0 | 2.0 |
| Evaporator glide (out-in) | K | 3.4 | 3.4 | 3.3 | 3.3 | 3.2 | 3.2 |
| Compressor suction pressure | bar | 2.90 | 2.96 | 3.01 | 3.07 | 3.12 | 3.17 |
| Compressor discharge pressure | bar | 14.8 | 15.0 | 15.3 | 15.5 | 15.7 | 15.9 |
| Suction line pressure drop | Pa/m | 1654 | 1622 | 1591 | 1563 | 1536 | 1511 |
| Pressure drop relative to reference | | 80.6% | 79.0% | 77.6% | 76.2% | 74.9% | 73.7% |
| Condenser dew point | °C. | 59.7 | 59.6 | 59.5 | 59.4 | 59.3 | 59.2 |
| Condenser bubble point | °C. | 50.3 | 50.4 | 50.5 | 50.6 | 50.7 | 50.8 |
| Condenser exit liquid temperature | °C. | 45.3 | 45.4 | 45.5 | 45.6 | 45.7 | 45.8 |
| Condenser mean temperature | °C. | 55.0 | 55.0 | 55.0 | 55.0 | 55.0 | 55.0 |
| Condenser glide (in-out) | K | 9.4 | 9.2 | 9.0 | 8.8 | 8.6 | 8.4 |

TABLE 17

Theoretical Performance Data of Selected R-744/R-134a/R-1234ze(E)
Blends Containing 4% R-744 and up to 15% R-134a

| Composition $CO_2$/R-134a/R-1234ze(E) percent by weight | | 4/0/96 | 4/2/94 | 4/4/92 | 4/6/90 | 4/8/88 | 4/10/86 | 4/15/81 |
|---|---|---|---|---|---|---|---|---|
| COP | | 2.54 | 2.54 | 2.54 | 2.54 | 2.54 | 2.54 | 2.54 |
| COP relative to Reference | | 104.0% | 104.0% | 104.0% | 104.0% | 104.0% | 104.0% | 104.0% |
| Volumetric capacity | $kJ/m^3$ | 1835 | 1851 | 1866 | 1882 | 1897 | 1912 | 1948 |
| Capacity relative to Reference | | 100.2% | 101.1% | 101.9% | 102.7% | 103.6% | 104.4% | 106.4% |
| Refrigeration effect | kJ/kg | 137.4 | 137.6 | 137.7 | 137.8 | 137.9 | 138.1 | 138.4 |
| Pressure ratio | | 5.27 | 5.26 | 5.25 | 5.23 | 5.22 | 5.21 | 5.19 |
| Refrigerant mass flow | kg/hr | 170.3 | 170.1 | 170.0 | 169.8 | 169.6 | 169.5 | 169.1 |
| Compressor discharge temperature | °C. | 87.3 | 87.4 | 87.6 | 87.7 | 87.8 | 88.0 | 88.3 |
| Evaporator inlet pressure | bar | 2.78 | 2.80 | 2.83 | 2.85 | 2.88 | 2.91 | 2.97 |
| Condenser inlet pressure | bar | 14.6 | 14.7 | 14.8 | 14.9 | 15.0 | 15.1 | 15.4 |
| Evaporator inlet temperature | °C. | −0.1 | −0.1 | −0.2 | −0.2 | −0.2 | −0.2 | −0.2 |
| Evaporator dewpoint | °C. | 4.1 | 4.1 | 4.2 | 4.2 | 4.2 | 4.2 | 4.2 |
| Evaporator exit gas temperature | °C. | 14.1 | 14.1 | 14.2 | 14.2 | 14.2 | 14.2 | 14.2 |
| Evaporator mean temperature | °C. | 2.0 | 2.0 | 2.0 | 2.0 | 2.0 | 2.0 | 2.0 |
| Evaporator glide (out-in) | K | 4.2 | 4.3 | 4.3 | 4.3 | 4.4 | 4.4 | 4.4 |
| Compressor suction pressure | bar | 2.78 | 2.80 | 2.83 | 2.85 | 2.88 | 2.91 | 2.97 |
| Compressor discharge pressure | bar | 14.6 | 14.7 | 14.8 | 14.9 | 15.0 | 15.1 | 15.4 |
| Suction line pressure drop | Pa/m | 1688 | 1673 | 1657 | 1643 | 1629 | 1615 | 1582 |
| Pressure drop relative to reference | | 82.3% | 81.5% | 80.8% | 80.1% | 79.4% | 78.7% | 77.1% |
| Condenser dew point | °C. | 61.3 | 61.3 | 61.2 | 61.2 | 61.2 | 61.1 | 61.0 |
| Condenser bubble point | °C. | 48.7 | 48.7 | 48.8 | 48.8 | 48.9 | 48.9 | 49.0 |
| Condenser exit liquid temperature | °C. | 43.7 | 43.7 | 43.8 | 43.8 | 43.9 | 43.9 | 44.0 |
| Condenser mean temperature | °C. | 55.0 | 55.0 | 55.0 | 55.0 | 55.0 | 55.0 | 55.0 |
| Condenser glide (in-out) | K | 12.6 | 12.6 | 12.5 | 12.4 | 12.3 | 12.2 | 12.0 |

TABLE 18

Theoretical Performance Data of Selected R-744/R-134a/R-1234ze(E)
Blends Containing 4% R-744 and 20-45% R-134a

| Composition $CO_2$/R-134a/R-1234ze(E) percent by weight | | 4/20/76 | 4/25/71 | 4/30/66 | 4/35/61 | 4/40/56 | 4/45/51 |
|---|---|---|---|---|---|---|---|
| COP | | 2.54 | 2.54 | 2.54 | 2.53 | 2.53 | 2.53 |
| COP relative to Reference | | 103.9% | 103.9% | 103.8% | 103.7% | 103.7% | 103.6% |
| Volumetric capacity | $kJ/m^3$ | 1983 | 2017 | 2050 | 2082 | 2112 | 2141 |
| Capacity relative to Reference | | 108.3% | 110.1% | 111.9% | 113.6% | 115.3% | 116.9% |
| Refrigeration effect | kJ/kg | 138.7 | 139.0 | 139.3 | 139.7 | 140.0 | 140.4 |
| Pressure ratio | | 5.17 | 5.15 | 5.13 | 5.11 | 5.09 | 5.08 |
| Refrigerant mass flow | kg/hr | 168.7 | 168.4 | 168.0 | 167.6 | 167.1 | 166.7 |
| Compressor discharge temperature | °C. | 88.7 | 89.0 | 89.4 | 89.8 | 90.2 | 90.6 |
| Evaporator inlet pressure | bar | 3.03 | 3.09 | 3.15 | 3.20 | 3.25 | 3.31 |
| Condenser inlet pressure | bar | 15.7 | 15.9 | 16.1 | 16.4 | 16.6 | 16.8 |
| Evaporator inlet temperature | °C. | −0.2 | −0.2 | −0.2 | −0.1 | −0.1 | −0.1 |
| Evaporator dewpoint | °C. | 4.2 | 4.2 | 4.2 | 4.1 | 4.1 | 4.1 |
| Evaporator exit gas temperature | °C. | 14.2 | 14.2 | 14.2 | 14.1 | 14.1 | 14.1 |
| Evaporator mean temperature | °C. | 2.0 | 2.0 | 2.0 | 2.0 | 2.0 | 2.0 |
| Evaporator glide (out-in) | K | 4.4 | 4.4 | 4.3 | 4.3 | 4.2 | 4.1 |
| Compressor suction pressure | bar | 3.03 | 3.09 | 3.15 | 3.20 | 3.25 | 3.31 |
| Compressor discharge pressure | bar | 15.7 | 15.9 | 16.1 | 16.4 | 16.6 | 16.8 |
| Suction line pressure drop | Pa/m | 1551 | 1523 | 1496 | 1470 | 1447 | 1424 |
| Pressure drop relative to reference | | 75.6% | 74.2% | 72.9% | 71.7% | 70.5% | 69.4% |
| Condenser dew point | °C. | 60.9 | 60.7 | 60.6 | 60.5 | 60.3 | 60.2 |
| Condenser bubble point | °C. | 49.1 | 49.3 | 49.4 | 49.5 | 49.7 | 49.8 |
| Condenser exit liquid temperature | °C. | 44.1 | 44.3 | 44.4 | 44.5 | 44.7 | 44.8 |
| Condenser mean temperature | °C. | 55.0 | 55.0 | 55.0 | 55.0 | 55.0 | 55.0 |
| Condenser glide (in-out) | K | 11.7 | 11.4 | 11.2 | 10.9 | 10.7 | 10.5 |

TABLE 19

Theoretical Performance Data of Selected R-744/R-134a/R-1234ze(E)
Blends Containing 5% R-744 and up to 15% R-134a

| Composition $CO_2$/R-134a/R-1234ze(E) percent by weight | | 5/0/95 | 5/2/93 | 5/4/91 | 5/6/89 | 5/8/87 | 5/10/85 | 5/15/80 |
|---|---|---|---|---|---|---|---|---|
| COP | | 2.54 | 2.54 | 2.54 | 2.54 | 2.54 | 2.54 | 2.54 |
| COP relative to Reference | | 103.9% | 103.9% | 103.9% | 103.9% | 103.9% | 103.9% | 103.8% |
| Volumetric capacity | $kJ/m^3$ | 1931 | 1947 | 1963 | 1978 | 1993 | 2008 | 2045 |
| Capacity relative to Reference | | 105.4% | 106.3% | 107.2% | 108.0% | 108.8% | 109.7% | 111.7% |
| Refrigeration effect | kJ/kg | 140.2 | 140.3 | 140.4 | 140.5 | 140.6 | 140.7 | 140.9 |
| Pressure ratio | | 5.33 | 5.31 | 5.30 | 5.29 | 5.28 | 5.27 | 5.24 |
| Refrigerant mass flow | kg/hr | 166.9 | 166.8 | 166.7 | 166.5 | 166.4 | 166.3 | 166.0 |
| Compressor discharge temperature | °C. | 88.9 | 89.1 | 89.2 | 89.3 | 89.4 | 89.5 | 89.9 |
| Evaporator inlet pressure | bar | 2.90 | 2.93 | 2.96 | 2.98 | 3.01 | 3.04 | 3.10 |
| Condenser inlet pressure | bar | 15.5 | 15.6 | 15.7 | 15.8 | 15.9 | 16.0 | 16.2 |
| Evaporator inlet temperature | °C. | −0.7 | −0.7 | −0.7 | −0.7 | −0.7 | −0.7 | −0.7 |
| Evaporator dewpoint | °C. | 4.7 | 4.7 | 4.7 | 4.7 | 4.7 | 4.7 | 4.7 |
| Evaporator exit gas temperature | °C. | 14.7 | 14.7 | 14.7 | 14.7 | 14.7 | 14.7 | 14.7 |
| Evaporator mean temperature | °C. | 2.0 | 2.0 | 2.0 | 2.0 | 2.0 | 2.0 | 2.0 |
| Evaporator glide (out-in) | K | 5.3 | 5.4 | 5.4 | 5.4 | 5.4 | 5.5 | 5.5 |
| Compressor suction pressure | bar | 2.90 | 2.93 | 2.96 | 2.98 | 3.01 | 3.04 | 3.10 |
| Compressor discharge pressure | bar | 15.5 | 15.6 | 15.7 | 15.8 | 15.9 | 16.0 | 16.2 |
| Suction line pressure drop | Pa/m | 1580 | 1566 | 1553 | 1540 | 1528 | 1515 | 1486 |
| Pressure drop relative to reference | | 77.0% | 76.3% | 75.7% | 75.1% | 74.5% | 73.9% | 72.4% |
| Condenser dew point | °C. | 62.5 | 62.4 | 62.4 | 62.3 | 62.3 | 62.2 | 62.1 |
| Condenser bubble point | °C. | 47.5 | 47.6 | 47.6 | 47.7 | 47.7 | 47.8 | 47.9 |
| Condenser exit liquid temperature | °C. | 42.5 | 42.6 | 42.6 | 42.7 | 42.7 | 42.8 | 42.9 |
| Condenser mean temperature | °C. | 55.0 | 55.0 | 55.0 | 55.0 | 55.0 | 55.0 | 55.0 |
| Condenser glide (in-out) | K | 15.0 | 14.9 | 14.8 | 14.7 | 14.5 | 14.4 | 14.1 |

TABLE 20

Theoretical Performance Data of Selected R-744/R-134a/R-1234ze(E)
Blends Containing 5% R-744 and 20-45% R-134a

| Composition $CO_2$/R-134a/R-1234ze(E) percent by weight | | 5/20/75 | 5/25/70 | 5/30/65 | 5/35/60 | 5/40/55 | 5/45/50 |
|---|---|---|---|---|---|---|---|
| COP | | 2.54 | 2.53 | 2.53 | 2.53 | 2.53 | 2.52 |
| COP relative to Reference | | 103.8% | 103.7% | 103.6% | 103.5% | 103.4% | 103.3% |
| Volumetric capacity | $kJ/m^3$ | 2081 | 2115 | 2148 | 2180 | 2210 | 2240 |
| Capacity relative to Reference | | 113.6% | 115.5% | 117.3% | 119.0% | 120.7% | 122.3% |
| Refrigeration effect | kJ/kg | 141.2 | 141.5 | 141.7 | 142.0 | 142.4 | 142.7 |
| Pressure ratio | | 5.21 | 5.19 | 5.17 | 5.15 | 5.13 | 5.12 |
| Refrigerant mass flow | kg/hr | 165.7 | 165.4 | 165.1 | 164.7 | 164.4 | 164.0 |
| Compressor discharge temperature | °C. | 90.2 | 90.6 | 90.9 | 91.3 | 91.7 | 92.1 |
| Evaporator inlet pressure | bar | 3.16 | 3.22 | 3.28 | 3.34 | 3.39 | 3.45 |
| Condenser inlet pressure | bar | 16.5 | 16.7 | 17.0 | 17.2 | 17.4 | 17.6 |
| Evaporator inlet temperature | °C. | −0.7 | −0.7 | −0.7 | −0.6 | −0.6 | −0.5 |
| Evaporator dewpoint | °C. | 4.7 | 4.7 | 4.7 | 4.6 | 4.6 | 4.5 |
| Evaporator exit gas temperature | °C. | 14.7 | 14.7 | 14.7 | 14.6 | 14.6 | 14.5 |
| Evaporator mean temperature | °C. | 2.0 | 2.0 | 2.0 | 2.0 | 2.0 | 2.0 |
| Evaporator glide (out-in) | K | 5.4 | 5.4 | 5.3 | 5.3 | 5.2 | 5.1 |
| Compressor suction pressure | bar | 3.16 | 3.22 | 3.28 | 3.34 | 3.39 | 3.45 |
| Compressor discharge pressure | bar | 16.5 | 16.7 | 17.0 | 17.2 | 17.4 | 17.6 |
| Suction line pressure drop | Pa/m | 1459 | 1434 | 1409 | 1387 | 1365 | 1345 |
| Pressure drop relative to reference | | 71.1% | 69.9% | 68.7% | 67.6% | 66.5% | 65.5% |
| Condenser dew point | °C. | 61.9 | 61.7 | 61.6 | 61.4 | 61.3 | 61.2 |
| Condenser bubble point | °C. | 48.1 | 48.3 | 48.4 | 48.6 | 48.7 | 48.8 |
| Condenser exit liquid temperature | °C. | 43.1 | 43.3 | 43.4 | 43.6 | 43.7 | 43.8 |
| Condenser mean temperature | °C. | 55.0 | 55.0 | 55.0 | 55.0 | 55.0 | 55.0 |
| Condenser glide (in-out) | K | 13.8 | 13.5 | 13.2 | 12.9 | 12.6 | 12.3 |

TABLE 21

Theoretical Performance Data of Selected R-744/R-134a/R-1234ze(E) Blends Containing 6% R-744 and up to 15% R-134a

| Composition CO$_2$/R-134a/R-1234ze(E) percent by weight | | 6/0/94 | 6/2/92 | 6/4/90 | 6/6/88 | 6/8/86 | 6/10/84 | 6/15/79 |
|---|---|---|---|---|---|---|---|---|
| COP | | 2.54 | 2.54 | 2.54 | 2.54 | 2.54 | 2.54 | 2.53 |
| COP relative to Reference | | 103.9% | 103.9% | 103.9% | 103.9% | 103.8% | 103.8% | 103.7% |
| Volumetric capacity | kJ/m$^3$ | 2030 | 2045 | 2061 | 2077 | 2092 | 2107 | 2144 |
| Capacity relative to Reference | | 110.8% | 111.7% | 112.5% | 113.4% | 114.2% | 115.0% | 117.1% |
| Refrigeration effect | kJ/kg | 142.8 | 142.9 | 143.0 | 143.0 | 143.1 | 143.2 | 143.4 |
| Pressure ratio | | 5.37 | 5.35 | 5.34 | 5.33 | 5.32 | 5.30 | 5.28 |
| Refrigerant mass flow | kg/hr | 163.9 | 163.8 | 163.7 | 163.6 | 163.5 | 163.4 | 163.2 |
| Compressor discharge temperature | °C. | 90.5 | 90.6 | 90.7 | 90.8 | 90.9 | 91.0 | 91.3 |
| Evaporator inlet pressure | bar | 3.03 | 3.06 | 3.09 | 3.12 | 3.14 | 3.17 | 3.24 |
| Condenser inlet pressure | bar | 16.3 | 16.4 | 16.5 | 16.6 | 16.7 | 16.8 | 17.1 |
| Evaporator inlet temperature | °C. | −1.2 | −1.3 | −1.3 | −1.3 | −1.3 | −1.3 | −1.3 |
| Evaporator dewpoint | °C. | 5.2 | 5.3 | 5.3 | 5.3 | 5.3 | 5.3 | 5.3 |
| Evaporator exit gas temperature | °C. | 15.2 | 15.3 | 15.3 | 15.3 | 15.3 | 15.3 | 15.3 |
| Evaporator mean temperature | °C. | 2.0 | 2.0 | 2.0 | 2.0 | 2.0 | 2.0 | 2.0 |
| Evaporator glide (out-in) | K | 6.5 | 6.5 | 6.5 | 6.5 | 6.5 | 6.5 | 6.5 |
| Compressor suction pressure | bar | 3.03 | 3.06 | 3.09 | 3.12 | 3.14 | 3.17 | 3.24 |
| Compressor discharge pressure | bar | 16.3 | 16.4 | 16.5 | 16.6 | 16.7 | 16.8 | 17.1 |
| Suction line pressure drop | Pa/m | 1483 | 1471 | 1459 | 1448 | 1437 | 1426 | 1400 |
| Pressure drop relative to reference | | 72.3% | 71.7% | 71.1% | 70.6% | 70.0% | 69.5% | 68.2% |
| Condenser dew point | °C. | 63.6 | 63.5 | 63.4 | 63.3 | 63.3 | 63.2 | 63.0 |
| Condenser bubble point | °C. | 46.4 | 46.5 | 46.6 | 46.7 | 46.7 | 46.8 | 47.0 |
| Condenser exit liquid temperature | °C. | 41.4 | 41.5 | 41.6 | 41.7 | 41.7 | 41.8 | 42.0 |
| Condenser mean temperature | °C. | 55.0 | 55.0 | 55.0 | 55.0 | 55.0 | 55.0 | 55.0 |
| Condenser glide (in-out) | K | 17.1 | 17.0 | 16.8 | 16.7 | 16.5 | 16.4 | 16.0 |

TABLE 22

Theoretical Performance Data of Selected R-744/R-134a/R-1234ze(E) Blends Containing 6% R-744 and 20-45% R-134a

| Composition CO$_2$/R-134a/R-1234ze(E) percent by weight | | 6/20/74 | 6/25/69 | 6/30/64 | 6/35/59 | 6/40/54 | 6/45/49 |
|---|---|---|---|---|---|---|---|
| COP | | 2.53 | 2.53 | 2.53 | 2.52 | 2.52 | 2.52 |
| COP relative to Reference | | 103.7% | 103.6% | 103.5% | 103.4% | 103.2% | 103.1% |
| Volumetric capacity | kJ/m$^3$ | 2180 | 2214 | 2247 | 2279 | 2310 | 2340 |
| Capacity relative to Reference | | 119.0% | 120.9% | 122.7% | 124.4% | 126.1% | 127.8% |
| Refrigeration effect | kJ/kg | 143.6 | 143.8 | 144.0 | 144.3 | 144.6 | 144.9 |
| Pressure ratio | | 5.25 | 5.22 | 5.20 | 5.18 | 5.16 | 5.15 |
| Refrigerant mass flow | kg/hr | 163.0 | 162.8 | 162.5 | 162.2 | 161.9 | 161.5 |
| Compressor discharge temperature | °C. | 91.7 | 92.0 | 92.3 | 92.7 | 93.1 | 93.5 |
| Evaporator inlet pressure | bar | 3.30 | 3.36 | 3.42 | 3.48 | 3.54 | 3.59 |
| Condenser inlet pressure | bar | 17.3 | 17.6 | 17.8 | 18.0 | 18.3 | 18.5 |
| Evaporator inlet temperature | °C. | −1.2 | −1.2 | −1.2 | −1.1 | −1.1 | −1.0 |
| Evaporator dewpoint | °C. | 5.2 | 5.2 | 5.2 | 5.1 | 5.1 | 5.0 |
| Evaporator exit gas temperature | °C. | 15.2 | 15.2 | 15.2 | 15.1 | 15.1 | 15.0 |
| Evaporator mean temperature | °C. | 2.0 | 2.0 | 2.0 | 2.0 | 2.0 | 2.0 |
| Evaporator glide (out-in) | K | 6.5 | 6.4 | 6.3 | 6.2 | 6.1 | 6.0 |
| Compressor suction pressure | bar | 3.30 | 3.36 | 3.42 | 3.48 | 3.54 | 3.59 |
| Compressor discharge pressure | bar | 17.3 | 17.6 | 17.8 | 18.0 | 18.3 | 18.5 |
| Suction line pressure drop | Pa/m | 1376 | 1353 | 1331 | 1310 | 1291 | 1272 |
| Pressure drop relative to reference | | 67.0% | 65.9% | 64.9% | 63.9% | 62.9% | 62.0% |
| Condenser dew point | °C. | 62.8 | 62.7 | 62.5 | 62.3 | 62.2 | 62.0 |
| Condenser bubble point | °C. | 47.2 | 47.3 | 47.5 | 47.7 | 47.8 | 48.0 |
| Condenser exit liquid temperature | °C. | 42.2 | 42.3 | 42.5 | 42.7 | 42.8 | 43.0 |
| Condenser mean temperature | °C. | 55.0 | 55.0 | 55.0 | 55.0 | 55.0 | 55.0 |
| Condenser glide (in-out) | K | 15.7 | 15.3 | 15.0 | 14.6 | 14.3 | 14.0 |

TABLE 23

Theoretical Performance Data of Selected R-744/R-1270/R-1234ze(E) Blends Containing 2% R-744

| Composition CO$_2$/propylene/ HFC1234ze(E) percent by weight | | 2/2/96 | 2/3/95 | 2/4/94 | 2/5/93 | 2/6/92 | 2/7/91 | 2/8/90 |
|---|---|---|---|---|---|---|---|---|
| COP | | 2.55 | 2.55 | 2.54 | 2.54 | 2.54 | 2.54 | 2.54 |
| COP relative to Reference | | 104.3% | 104.2% | 104.1% | 104.1% | 104.0% | 104.0% | 103.9% |
| Volumetric capacity | kJ/m$^3$ | 1755 | 1806 | 1855 | 1902 | 1948 | 1993 | 2036 |
| Capacity relative to Reference | | 95.8% | 98.6% | 101.3% | 103.9% | 106.4% | 108.8% | 111.2% |
| Refrigeration effect | kJ/kg | 134.6 | 136.1 | 137.5 | 138.9 | 140.2 | 141.5 | 142.7 |
| Pressure ratio | | 5.07 | 5.04 | 5.01 | 4.98 | 4.95 | 4.91 | 4.88 |
| Refrigerant mass flow | kg/hr | 173.9 | 171.9 | 170.1 | 168.4 | 166.9 | 165.4 | 163.9 |
| Compressor discharge temperature | °C. | 84.6 | 85.0 | 85.3 | 85.7 | 85.9 | 86.2 | 86.4 |
| Evaporator inlet pressure | bar | 2.72 | 2.80 | 2.89 | 2.98 | 3.07 | 3.15 | 3.23 |
| Condenser inlet pressure | bar | 13.8 | 14.1 | 14.5 | 14.8 | 15.2 | 15.5 | 15.8 |
| Evaporator inlet temperature | °C. | 0.4 | 0.1 | −0.2 | −0.4 | −0.6 | −0.8 | −1.0 |
| Evaporator dewpoint | °C. | 3.6 | 3.9 | 4.2 | 4.4 | 4.6 | 4.8 | 5.0 |
| Evaporator exit gas temperature | °C. | 13.6 | 13.9 | 14.2 | 14.4 | 14.6 | 14.8 | 15.0 |
| Evaporator mean temperature | °C. | 2.0 | 2.0 | 2.0 | 2.0 | 2.0 | 2.0 | 2.0 |
| Evaporator glide (out-in) | K | 3.3 | 3.8 | 4.4 | 4.8 | 5.2 | 5.6 | 6.0 |
| Compressor suction pressure | bar | 2.72 | 2.80 | 2.89 | 2.98 | 3.07 | 3.15 | 3.23 |
| Compressor discharge pressure | bar | 13.8 | 14.1 | 14.5 | 14.8 | 15.2 | 15.5 | 15.8 |
| Suction line pressure drop | Pa/m | 1793 | 1728 | 1669 | 1615 | 1566 | 1521 | 1479 |
| Pressure drop relative to reference | | 87.4% | 84.2% | 81.3% | 78.7% | 76.3% | 74.1% | 72.1% |
| Condenser dew point | °C. | 59.3 | 59.6 | 59.8 | 59.9 | 60.0 | 60.1 | 60.1 |
| Condenser bubble point | °C. | 50.7 | 50.4 | 50.2 | 50.1 | 50.0 | 49.9 | 49.9 |
| Condenser exit liquid temperature | °C. | 45.7 | 45.4 | 45.2 | 45.1 | 45.0 | 44.9 | 44.9 |
| Condenser mean temperature | °C. | 55.0 | 55.0 | 55.0 | 55.0 | 55.0 | 55.0 | 55.0 |
| Condenser glide (in-out) | K | 8.6 | 9.1 | 9.5 | 9.8 | 10.1 | 10.2 | 10.3 |

TABLE 24

Theoretical Performance Data of Selected R-744/R-1270/R-1234ze(E) Blends Containing 3% R-744

| Composition CO$_2$/propylene/ HFC1234ze(E) percent by weight | | 3/2/95 | 3/3/94 | 3/4/93 | 3/5/92 | 3/6/91 | 3/7/90 | 3/8/89 |
|---|---|---|---|---|---|---|---|---|
| COP | | 2.54 | 2.54 | 2.54 | 2.54 | 2.54 | 2.54 | 2.53 |
| COP relative to Reference | | 104.1% | 104.0% | 103.9% | 103.9% | 103.8% | 103.8% | 103.7% |
| Volumetric capacity | kJ/m$^3$ | 1848 | 1899 | 1949 | 1996 | 2043 | 2087 | 2130 |
| Capacity relative to Reference | | 100.9% | 103.7% | 106.4% | 109.0% | 111.5% | 114.0% | 116.3% |
| Refrigeration effect | kJ/kg | 137.6 | 139.0 | 140.3 | 141.6 | 142.9 | 144.1 | 145.3 |
| Pressure ratio | | 5.14 | 5.11 | 5.08 | 5.04 | 5.01 | 4.97 | 4.93 |
| Refrigerant mass flow | kg/hr | 170.1 | 168.4 | 166.7 | 165.2 | 163.8 | 162.4 | 161.1 |
| Compressor discharge temperature | °C. | 86.4 | 86.7 | 87.0 | 87.3 | 87.5 | 87.7 | 87.9 |
| Evaporator inlet pressure | bar | 2.84 | 2.93 | 3.02 | 3.11 | 3.19 | 3.28 | 3.37 |
| Condenser inlet pressure | bar | 14.6 | 15.0 | 15.3 | 15.7 | 16.0 | 16.3 | 16.6 |
| Evaporator inlet temperature | °C. | −0.2 | −0.4 | −0.7 | −0.9 | −1.1 | −1.3 | −1.5 |
| Evaporator dewpoint | °C. | 4.2 | 4.4 | 4.7 | 4.9 | 5.1 | 5.3 | 5.5 |
| Evaporator exit gas temperature | °C. | 14.2 | 14.4 | 14.7 | 14.9 | 15.1 | 15.3 | 15.5 |
| Evaporator mean temperature | °C. | 2.0 | 2.0 | 2.0 | 2.0 | 2.0 | 2.0 | 2.0 |
| Evaporator glide (out-in) | K | 4.3 | 4.9 | 5.4 | 5.8 | 6.2 | 6.6 | 6.9 |
| Compressor suction pressure | bar | 2.84 | 2.93 | 3.02 | 3.11 | 3.19 | 3.28 | 3.37 |
| Compressor discharge pressure | bar | 14.6 | 15.0 | 15.3 | 15.7 | 16.0 | 16.3 | 16.6 |
| Suction line pressure drop | Pa/m | 1675 | 1617 | 1565 | 1517 | 1473 | 1432 | 1395 |
| Pressure drop relative to reference | | 81.6% | 78.8% | 76.3% | 73.9% | 71.8% | 69.8% | 68.0% |
| Condenser dew point | °C. | 60.6 | 60.8 | 61.0 | 61.1 | 61.1 | 61.2 | 61.2 |
| Condenser bubble point | °C. | 49.4 | 49.2 | 49.0 | 48.9 | 48.9 | 48.8 | 48.8 |
| Condenser exit liquid temperature | °C. | 44.4 | 44.2 | 44.0 | 43.9 | 43.9 | 43.8 | 43.8 |
| Condenser mean temperature | °C. | 55.0 | 55.0 | 55.0 | 55.0 | 55.0 | 55.0 | 55.0 |
| Condenser glide (in-out) | K | 11.3 | 11.7 | 12.0 | 12.2 | 12.3 | 12.3 | 12.3 |

TABLE 25

Theoretical Performance Data of Selected R-744/R-1270/R-1234ze(E) Blends Containing 4% R-744

| Composition $CO_2$/propylene/ HFC1234ze(E) percent by weight | | 4/2/94 | 4/3/93 | 4/4/92 | 4/5/91 | 4/6/90 | 4/7/89 |
|---|---|---|---|---|---|---|---|
| COP | | 2.54 | 2.54 | 2.54 | 2.53 | 2.53 | 2.53 |
| COP relative to Reference | | 103.9% | 103.9% | 103.8% | 103.8% | 103.7% | 103.6% |
| Volumetric capacity | kJ/m³ | 1943 | 1995 | 2044 | 2092 | 2138 | 2183 |
| Capacity relative to Reference | | 106.1% | 108.9% | 111.6% | 114.2% | 116.8% | 119.2% |
| Refrigeration effect | kJ/kg | 140.3 | 141.7 | 143.0 | 144.2 | 145.4 | 146.5 |
| Pressure ratio | | 5.21 | 5.17 | 5.13 | 5.09 | 5.05 | 5.01 |
| Refrigerant mass flow | kg/hr | 166.7 | 165.2 | 163.7 | 162.3 | 161.0 | 159.7 |
| Compressor discharge temperature | ° C. | 88.0 | 88.3 | 88.6 | 88.8 | 89.0 | 89.2 |
| Evaporator inlet pressure | bar | 2.96 | 3.06 | 3.15 | 3.24 | 3.33 | 3.42 |
| Condenser inlet pressure | bar | 15.4 | 15.8 | 16.2 | 16.5 | 16.8 | 17.1 |
| Evaporator inlet temperature | ° C. | −0.7 | −1.0 | −1.2 | −1.4 | −1.6 | −1.8 |
| Evaporator dewpoint | ° C. | 4.7 | 5.0 | 5.2 | 5.4 | 5.6 | 5.8 |
| Evaporator exit gas temperature | ° C. | 14.7 | 15.0 | 15.2 | 15.4 | 15.6 | 15.8 |
| Evaporator mean temperature | ° C. | 2.0 | 2.0 | 2.0 | 2.0 | 2.0 | 2.0 |
| Evaporator glide (out-in) | K | 5.4 | 5.9 | 6.4 | 6.8 | 7.2 | 7.6 |
| Compressor suction pressure | bar | 2.96 | 3.06 | 3.15 | 3.24 | 3.33 | 3.42 |
| Compressor discharge pressure | bar | 15.4 | 15.8 | 16.2 | 16.5 | 16.8 | 17.1 |
| Suction line pressure drop | Pa/m | 1569 | 1518 | 1471 | 1428 | 1389 | 1353 |
| Pressure drop relative to reference | | 76.5% | 74.0% | 71.7% | 69.6% | 67.7% | 65.9% |
| Condenser dew point | ° C. | 61.8 | 62.0 | 62.1 | 62.1 | 62.1 | 62.1 |
| Condenser bubble point | ° C. | 48.2 | 48.0 | 47.9 | 47.9 | 47.9 | 47.9 |
| Condenser exit liquid temperature | ° C. | 43.2 | 43.0 | 42.9 | 42.9 | 42.9 | 42.9 |
| Condenser mean temperature | ° C. | 55.0 | 55.0 | 55.0 | 55.0 | 55.0 | 55.0 |
| Condenser glide (in-out) | K | 13.6 | 13.9 | 14.1 | 14.2 | 14.3 | 14.3 |

TABLE 26

Theoretical Performance Data of Selected R-744/R-1270/R-1234ze(E) Blends Containing 5% R-744

| Composition $CO_2$/propylene/ HFC1234ze(E) percent by weight | | 5/2/93 | 5/3/92 | 5/4/91 | 5/5/90 | 5/6/89 |
|---|---|---|---|---|---|---|
| COP | | 2.54 | 2.54 | 2.53 | 2.53 | 2.53 |
| COP relative to Reference | | 103.8% | 103.8% | 103.7% | 103.7% | 103.6% |
| Volumetric capacity | kJ/m³ | 2040 | 2092 | 2141 | 2189 | 2235 |
| Capacity relative to Reference | | 111.4% | 114.2% | 116.9% | 119.5% | 122.0% |
| Refrigeration effect | kJ/kg | 142.9 | 144.2 | 145.4 | 146.6 | 147.7 |
| Pressure ratio | | 5.25 | 5.21 | 5.17 | 5.13 | 5.08 |
| Refrigerant mass flow | kg/hr | 163.7 | 162.3 | 160.9 | 159.6 | 158.4 |
| Compressor discharge temperature | ° C. | 89.6 | 89.8 | 90.0 | 90.2 | 90.3 |
| Evaporator inlet pressure | bar | 3.09 | 3.19 | 3.28 | 3.38 | 3.47 |
| Condenser inlet pressure | bar | 16.3 | 16.6 | 17.0 | 17.3 | 17.6 |
| Evaporator inlet temperature | ° C. | −1.3 | −1.5 | −1.7 | −1.9 | −2.1 |
| Evaporator dewpoint | ° C. | 5.3 | 5.5 | 5.7 | 5.9 | 6.1 |
| Evaporator exit gas temperature | ° C. | 15.3 | 15.5 | 15.7 | 15.9 | 16.1 |
| Evaporator mean temperature | ° C. | 2.0 | 2.0 | 2.0 | 2.0 | 2.0 |
| Evaporator glide (out-in) | K | 6.5 | 7.0 | 7.5 | 7.9 | 8.2 |
| Compressor suction pressure | bar | 3.09 | 3.19 | 3.28 | 3.38 | 3.47 |
| Compressor discharge pressure | bar | 16.3 | 16.6 | 17.0 | 17.3 | 17.6 |
| Suction line pressure drop | Pa/m | 1474 | 1429 | 1387 | 1348 | 1313 |
| Pressure drop relative to reference | | 71.9% | 69.6% | 67.6% | 65.7% | 64.0% |
| Condenser dew point | ° C. | 62.9 | 63.0 | 63.0 | 63.0 | 63.0 |
| Condenser bubble point | ° C. | 47.1 | 47.0 | 47.0 | 47.0 | 47.0 |
| Condenser exit liquid temperature | ° C. | 42.1 | 42.0 | 42.0 | 42.0 | 42.0 |
| Condenser mean temperature | ° C. | 55.0 | 55.0 | 55.0 | 55.0 | 55.0 |
| Condenser glide (in-out) | K | 15.7 | 15.9 | 16.1 | 16.1 | 16.1 |

TABLE 27

Theoretical Performance Data of Selected R-744/R-290/R-1234ze(E) Blends Containing 2% R-744

| Composition CO$_2$/propane/ HFC1234ze(E) percent by weight | | 2/2/96 | 2/3/95 | 2/4/94 | 2/5/93 | 2/6/92 | 2/7/91 | 2/8/90 |
|---|---|---|---|---|---|---|---|---|
| COP | | 2.54 | 2.53 | 2.53 | 2.53 | 2.52 | 2.52 | 2.52 |
| COP relative to Reference | | 103.9% | 103.7% | 103.6% | 103.4% | 103.3% | 103.1% | 103.0% |
| Volumetric capacity | kJ/m$^3$ | 1758 | 1808 | 1856 | 1902 | 1946 | 1988 | 2028 |
| Capacity relative to Reference | | 96.0% | 98.7% | 101.3% | 103.9% | 106.3% | 108.5% | 110.7% |
| Refrigeration effect | kJ/kg | 133.9 | 134.9 | 135.9 | 136.7 | 137.5 | 138.3 | 139.0 |
| Pressure ratio | | 5.08 | 5.06 | 5.03 | 4.99 | 4.95 | 4.91 | 4.87 |
| Refrigerant mass flow | kg/hr | 174.8 | 173.4 | 172.2 | 171.1 | 170.1 | 169.2 | 168.4 |
| Compressor discharge temperature | °C. | 84.5 | 84.7 | 84.9 | 85.1 | 85.1 | 85.2 | 85.2 |
| Evaporator inlet pressure | bar | 2.73 | 2.82 | 2.91 | 3.00 | 3.09 | 3.18 | 3.27 |
| Condenser inlet pressure | bar | 13.9 | 14.3 | 14.6 | 15.0 | 15.3 | 15.6 | 15.9 |
| Evaporator inlet temperature | °C. | 0.3 | 0.0 | −0.3 | −0.6 | −0.8 | −1.0 | −1.2 |
| Evaporator dewpoint | °C. | 3.7 | 4.0 | 4.3 | 4.6 | 4.8 | 5.0 | 5.2 |
| Evaporator exit gas temperature | °C. | 13.7 | 14.0 | 14.3 | 14.6 | 14.8 | 15.0 | 15.2 |
| Evaporator mean temperature | °C. | 2.0 | 2.0 | 2.0 | 2.0 | 2.0 | 2.0 | 2.0 |
| Evaporator glide (out-in) | K | 3.5 | 4.1 | 4.6 | 5.2 | 5.6 | 6.0 | 6.3 |
| Compressor suction pressure | bar | 2.73 | 2.82 | 2.91 | 3.00 | 3.09 | 3.18 | 3.27 |
| Compressor discharge pressure | bar | 13.9 | 14.3 | 14.6 | 15.0 | 15.3 | 15.6 | 15.9 |
| Suction line pressure drop | Pa/m | 1798 | 1737 | 1683 | 1635 | 1591 | 1551 | 1515 |
| Pressure drop relative to reference | | 87.6% | 84.7% | 82.0% | 79.7% | 77.5% | 75.6% | 73.8% |
| Condenser dew point | °C. | 59.5 | 59.8 | 60.0 | 60.1 | 60.2 | 60.2 | 60.1 |
| Condenser bubble point | °C. | 50.5 | 50.2 | 50.0 | 49.9 | 49.8 | 49.8 | 49.9 |
| Condenser exit liquid temperature | °C. | 45.5 | 45.2 | 45.0 | 44.9 | 44.8 | 44.8 | 44.9 |
| Condenser mean temperature | °C. | 55.0 | 55.0 | 55.0 | 55.0 | 55.0 | 55.0 | 55.0 |
| Condenser glide (in-out) | K | 9.0 | 9.6 | 10.0 | 10.2 | 10.3 | 10.4 | 10.3 |

TABLE 28

Theoretical Performance Data of Selected R-744/R-290/R-1234ze(E) Blends Containing 3% R-744

| Composition CO$_2$/propane/ HFC1234ze(E) percent by weight | | 3/2/95 | 3/3/94 | 3/4/93 | 3/5/92 | 3/6/91 | 3/7/90 | 3/8/89 |
|---|---|---|---|---|---|---|---|---|
| COP | | 2.53 | 2.53 | 2.53 | 2.52 | 2.52 | 2.51 | 2.51 |
| COP relative to Reference | | 103.7% | 103.5% | 103.4% | 103.2% | 103.1% | 102.9% | 102.8% |
| Volumetric capacity | kJ/m$^3$ | 1851 | 1902 | 1950 | 1996 | 2040 | 2082 | 2121 |
| Capacity relative to Reference | | 101.1% | 103.8% | 106.5% | 109.0% | 111.4% | 113.7% | 115.8% |
| Refrigeration effect | kJ/kg | 136.8 | 137.8 | 138.6 | 139.4 | 140.2 | 140.8 | 141.5 |
| Pressure ratio | | 5.16 | 5.13 | 5.10 | 5.05 | 5.01 | 4.97 | 4.92 |
| Refrigerant mass flow | kg/hr | 171.0 | 169.8 | 168.8 | 167.8 | 167.0 | 166.1 | 165.4 |
| Compressor discharge temperature | °C. | 86.3 | 86.5 | 86.6 | 86.7 | 86.7 | 86.7 | 86.7 |
| Evaporator inlet pressure | bar | 2.85 | 2.94 | 3.04 | 3.13 | 3.22 | 3.31 | 3.40 |
| Condenser inlet pressure | bar | 14.7 | 15.1 | 15.5 | 15.8 | 16.2 | 16.5 | 16.8 |
| Evaporator inlet temperature | °C. | −0.3 | −0.6 | −0.8 | −1.1 | −1.3 | −1.5 | −1.6 |
| Evaporator dewpoint | °C. | 4.3 | 4.6 | 4.8 | 5.1 | 5.3 | 5.5 | 5.6 |
| Evaporator exit gas temperature | °C. | 14.3 | 14.6 | 14.8 | 15.1 | 15.3 | 15.5 | 15.6 |
| Evaporator mean temperature | °C. | 2.0 | 2.0 | 2.0 | 2.0 | 2.0 | 2.0 | 2.0 |
| Evaporator glide (out-in) | K | 4.5 | 5.1 | 5.7 | 6.2 | 6.6 | 6.9 | 7.2 |
| Compressor suction pressure | bar | 2.85 | 2.94 | 3.04 | 3.13 | 3.22 | 3.31 | 3.40 |
| Compressor discharge pressure | bar | 14.7 | 15.1 | 15.5 | 15.8 | 16.2 | 16.5 | 16.8 |
| Suction line pressure drop | Pa/m | 1679 | 1626 | 1578 | 1535 | 1496 | 1461 | 1429 |
| Pressure drop relative to reference | | 81.8% | 79.2% | 76.9% | 74.8% | 72.9% | 71.2% | 69.6% |
| Condenser dew point | °C. | 60.8 | 61.1 | 61.2 | 61.3 | 61.3 | 61.2 | 61.2 |
| Condenser bubble point | °C. | 49.2 | 48.9 | 48.8 | 48.7 | 48.7 | 48.8 | 48.8 |
| Condenser exit liquid temperature | °C. | 44.2 | 43.9 | 43.8 | 43.7 | 43.7 | 43.8 | 43.8 |
| Condenser mean temperature | °C. | 55.0 | 55.0 | 55.0 | 55.0 | 55.0 | 55.0 | 55.0 |
| Condenser glide (in-out) | K | 11.7 | 12.1 | 12.4 | 12.5 | 12.5 | 12.4 | 12.3 |

TABLE 29

Theoretical Performance Data of Selected R-744/R-290/R-1234ze(E) Blends Containing 4% R-744

| Composition CO$_2$/propane/ HFC1234ze(E) percent by weight | | 4/2/94 | 4/3/93 | 4/4/92 | 4/5/91 | 4/6/90 | 4/7/89 |
|---|---|---|---|---|---|---|---|
| COP | | 2.53 | 2.53 | 2.52 | 2.52 | 2.51 | 2.51 |
| COP relative to Reference | | 103.6% | 103.4% | 103.3% | 103.1% | 102.9% | 102.8% |
| Volumetric capacity | kJ/m$^3$ | 1947 | 1998 | 2046 | 2092 | 2136 | 2177 |
| Capacity relative to Reference | | 106.3% | 109.1% | 111.7% | 114.2% | 116.6% | 118.9% |
| Refrigeration effect | kJ/kg | 139.6 | 140.5 | 141.3 | 142.0 | 142.6 | 143.3 |
| Pressure ratio | | 5.23 | 5.19 | 5.15 | 5.10 | 5.06 | 5.01 |
| Refrigerant mass flow | kg/hr | 167.6 | 166.6 | 165.7 | 164.8 | 164.1 | 163.3 |
| Compressor discharge temperature | °C. | 87.9 | 88.1 | 88.1 | 88.2 | 88.2 | 88.2 |
| Evaporator inlet pressure | bar | 2.98 | 3.07 | 3.17 | 3.27 | 3.36 | 3.45 |
| Condenser inlet pressure | bar | 15.5 | 15.9 | 16.3 | 16.7 | 17.0 | 17.3 |
| Evaporator inlet temperature | °C. | −0.8 | −1.1 | −1.4 | −1.6 | −1.8 | −1.9 |
| Evaporator dewpoint | °C. | 4.8 | 5.1 | 5.4 | 5.6 | 5.8 | 5.9 |
| Evaporator exit gas temperature | °C. | 14.8 | 15.1 | 15.4 | 15.6 | 15.8 | 15.9 |
| Evaporator mean temperature | °C. | 2.0 | 2.0 | 2.0 | 2.0 | 2.0 | 2.0 |
| Evaporator glide (out-in) | K | 5.6 | 6.2 | 6.7 | 7.2 | 7.5 | 7.9 |
| Compressor suction pressure | bar | 2.98 | 3.07 | 3.17 | 3.27 | 3.36 | 3.45 |
| Compressor discharge pressure | bar | 15.5 | 15.9 | 16.3 | 16.7 | 17.0 | 17.3 |
| Suction line pressure drop | Pa/m | 1573 | 1525 | 1483 | 1445 | 1410 | 1379 |
| Pressure drop relative to reference | | 76.7% | 74.3% | 72.3% | 70.4% | 68.7% | 67.2% |
| Condenser dew point | °C. | 62.0 | 62.2 | 62.3 | 62.3 | 62.3 | 62.2 |
| Condenser bubble point | °C. | 48.0 | 47.8 | 47.7 | 47.7 | 47.7 | 47.8 |
| Condenser exit liquid temperature | °C. | 43.0 | 42.8 | 42.7 | 42.7 | 42.7 | 42.8 |
| Condenser mean temperature | °C. | 55.0 | 55.0 | 55.0 | 55.0 | 55.0 | 55.0 |
| Condenser glide (in-out) | K | 14.0 | 14.4 | 14.5 | 14.6 | 14.5 | 14.4 |

TABLE 30

Theoretical Performance Data of Selected R-744/R-290/R-1234ze(E) Blends Containing 5% R-744

| Composition CO$_2$/propane/ HFC1234ze(E) percent by weight | | 5/2/93 | 5/3/92 | 5/4/91 | 5/5/90 | 5/6/89 |
|---|---|---|---|---|---|---|
| COP | | 2.53 | 2.52 | 2.52 | 2.52 | 2.51 |
| COP relative to Reference | | 103.5% | 103.3% | 103.2% | 103.0% | 102.8% |
| Volumetric capacity | kJ/m$^3$ | 2044 | 2096 | 2144 | 2190 | 2233 |
| Capacity relative to Reference | | 111.6% | 114.4% | 117.1% | 119.6% | 121.9% |
| Refrigeration effect | kJ/kg | 142.2 | 143.0 | 143.7 | 144.4 | 145.0 |
| Pressure ratio | | 5.27 | 5.23 | 5.19 | 5.14 | 5.09 |
| Refrigerant mass flow | kg/hr | 164.6 | 163.7 | 162.8 | 162.1 | 161.4 |
| Compressor discharge temperature | °C. | 89.4 | 89.5 | 89.6 | 89.6 | 89.6 |
| Evaporator inlet pressure | bar | 3.11 | 3.21 | 3.31 | 3.40 | 3.50 |
| Condenser inlet pressure | bar | 16.4 | 16.8 | 17.2 | 17.5 | 17.8 |
| Evaporator inlet temperature | °C. | −1.3 | −1.6 | −1.9 | −2.1 | −2.3 |
| Evaporator dewpoint | °C. | 5.3 | 5.6 | 5.9 | 6.1 | 6.3 |
| Evaporator exit gas temperature | °C. | 15.3 | 15.6 | 15.9 | 16.1 | 16.3 |
| Evaporator mean temperature | °C. | 2.0 | 2.0 | 2.0 | 2.0 | 2.0 |
| Evaporator glide (out-in) | K | 6.7 | 7.2 | 7.7 | 8.2 | 8.5 |
| Compressor suction pressure | bar | 3.11 | 3.21 | 3.31 | 3.40 | 3.50 |
| Compressor discharge pressure | bar | 16.4 | 16.8 | 17.2 | 17.5 | 17.8 |
| Suction line pressure drop | Pa/m | 1477 | 1435 | 1397 | 1363 | 1333 |
| Pressure drop relative to reference | | 72.0% | 69.9% | 68.1% | 66.4% | 64.9% |
| Condenser dew point | °C. | 63.1 | 63.2 | 63.2 | 63.2 | 63.2 |
| Condenser bubble point | °C. | 46.9 | 46.8 | 46.8 | 46.8 | 46.8 |
| Condenser exit liquid temperature | °C. | 41.9 | 41.8 | 41.8 | 41.8 | 41.8 |
| Condenser mean temperature | °C. | 55.0 | 55.0 | 55.0 | 55.0 | 55.0 |
| Condenser glide (in-out) | K | 16.2 | 16.4 | 16.5 | 16.4 | 16.3 |

I claim:

1. A heat transfer composition comprising:
   trans-1,3,3,3-tetrafluoropropene (R-1234ze(E));
   greater than zero and up to about 12% by weight carbon dioxide (R-744, CO2); and
   a third component selected from a group consisting of propylene, propane and mixtures thereof, wherein the composition has an evaporator temperature glide of less than about 10 K.

2. A composition according to claim 1, said composition comprising at least about 45% by weight of said R-1234ze(E).

3. A method for generating greenhouse gas emission credit, said method comprising the steps of:
   (i) replacing an existing compound or composition with a composition as defined in claim 1, wherein said composition as defined in claim 1 has a lower GWP than said existing compound or composition; and
   (ii) obtaining greenhouse gas emission credit for said replacing step.

4. A composition according to claim 1, said composition comprising from about 1 to about 10% by weight of said CO2.

5. A composition according to claim 4, said composition comprising about 2 to about 7% by weight of said CO2.

6. A composition according to claim 1, said composition comprising greater than zero percent and up to about 50% by weight of said third component.

7. A composition according to claim 6, wherein said third component is selected from a group consisting of propylene and propane, said composition comprising from about 1 to about 10% by weight of said third component.

8. A composition according to claim 7, said composition comprising from about 2 to about 8% by weight of said third component.

9. A composition according to claim 8, said composition comprising from about 2 to about 10% by weight of said R-744.

10. A composition according to claim 8, said composition comprising from about 3 to about 6% by weight of said third component.

11. A composition according to claim 10, said composition comprising from about 2 to about 10% by weight of said R-744.

12. A composition according to claim 1, said composition consisting essentially of said R-1234ze(E), said R-744 and said third component.

13. A composition according to claim 1, further comprising at least one of pentafluoroethane (R-125) and 1,1,1,2-tetrafluoroethane (R-134a).

14. A composition according to claim 13, wherein said composition has a GWP of less than 150.

15. A composition according to claim 13, wherein said composition has a GWP of less than 800.

16. A composition according to claim 1, said composition comprising a temperature glide of less than about 8K.

17. A composition according claim 1, said composition being less flammable than at least one of R-32 alone, R-152a alone, and R-1234yf alone.

18. A composition according to claim 17, said composition being less flammable than R-1234yf alone.

19. A composition according to claim 17, said composition comprising at least one of:
   (a) a higher flammable limit;
   (b) a higher ignition energy; and
   (c) a lower flame velocity
as compared to at least one of R-32 alone, R-152a alone and R-1234yf alone.

20. A composition according to claim 19, said composition comprising at least one of:
   (a) a higher flammable limit;
   (b) a higher ignition energy; and
   (c) a lower flame velocity
as compared to R-1234yf alone.

21. A composition according to claim 1, said composition comprising a fluorine ratio (F/(F+H)) of from about 0.42 to about 0.67.

22. A composition according to claim 21, said composition comprising a fluorine ratio (F/(F+H)) of from about 0.44 to about 0.65.

23. A composition according to claim 22, said composition comprising a fluorine ratio (F/(F+H)) of from about 0.46 to about 0.65.

24. A composition according to claim 1, said composition being non-flammable.

25. A composition according to claim 1, said composition further comprising a lubricant selected from a group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

26. A composition according to claim 25, wherein said lubricant is selected from a group consisting of mineral oil, silicone oil, polyalkyl benzenes (PABs), poly (alpha-olefins) and combinations thereof.

27. A composition according to claim 26, wherein said lubricant is selected from a group consisting of mineral oil, polyalkyl benzenes (PABs), and combinations thereof.

28. A composition according to claim 25, said composition further comprising a stabiliser.

29. A composition according to claim 28, wherein said stabiliser is selected from a group consisting of diene-based compounds, phosphates, phenol compounds and epoxides, and mixtures thereof.

30. A composition according to claim 1, said composition further comprising a flame retardant.

31. A composition according to claim 30, wherein said flame retardant is selected from a group consisting of tri-(2-chloroethyl)-phosphate, (chloropropyl)phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

32. A heat transfer device containing a composition as defined in claim 1.

33. A heat transfer device according to claim 32, wherein said heat transfer device comprises a refrigeration device.

34. A heat transfer device according to claim 32, wherein said heat transfer device comprises a device selected from a group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems.

35. A heat transfer device according to claim 32, said heat transfer device comprising a compressor.

36. A heat transfer device according to claim 32, wherein said device optionally previously contained an existing refrigerant prior to containing said composition according to claim 1, said composition comprising a volumetric refrigeration capacity within about 15% of said existing refrigerant.

37. A heat transfer device according to claim 36, said composition comprising a volumetric refrigeration capacity within about 10% of said existing refrigerant.

38. A heat transfer device according to claim 32, wherein said device optionally previously contained an existing refrigerant prior to containing said composition according to claim 1, said composition comprising a cycle efficiency within about 5% of said existing refrigerant.

39. A heat transfer device according to claim 32, wherein said device previously contained an existing refrigerant prior to containing said composition according to claim 1, said composition comprising a compressor discharge temperature within about 15K of said existing refrigerant.

40. A heat transfer device according to claim 39, said composition comprising a compressor discharge temperature within about 10K of said existing refrigerant.

41. A blowing agent comprising a composition as defined in claim 1.

42. A foamable composition comprising:
one or more components capable of forming foam; and
a composition as defined in claim 1,
wherein said one or more components capable of forming foam are selected from a group consisting of polyurethanes, thermoplastic polymers and resins, epoxy resins, and mixtures thereof.

43. A foamable composition according to claim 42, wherein said one or more components capable of forming foam comprise polystyrene.

44. A foam comprising a composition as defined in claim 1.

45. A sprayable composition comprising:
a material to be sprayed; and
a propellant comprising a composition as defined in claim 1.

46. A method for cooling an article, said method comprising the steps of:
condensing a composition defined in claim 1; and
thereafter, evaporating said composition in a vicinity of an article to be cooled.

47. A method for heating an article, said method comprising the steps of:
condensing a composition as defined in claim 1 in a vicinity of an article to be heated; and
thereafter, evaporating said composition.

48. A method for extracting a substance from biomass, said method comprising the steps of:
contacting a biomass with a solvent comprising a composition as defined in claim 1; and
separating a substance from said solvent.

49. A method of cleaning an article, said method comprising the step of:
contacting an article with a solvent comprising a composition as defined in claim 1.

50. A method of extracting a material from an aqueous solution or a particulate solid matrix, said method comprising the steps of:
contacting one of an aqueous solution and a particulate solid matrix with a solvent comprising a composition as defined in claim 1; and
separating a material from said solvent.

51. A mechanical power generation device containing a composition as defined in claim 1.

52. A mechanical power generating device according to claim 51 which is adapted to use a Rankine Cycle or modification thereof to generate work from heat.

53. A method of retrofitting a heat transfer device, said method comprising the steps of:
removing at least some of an existing heat transfer fluid from said heat transfer device; and
introducing into said heat transfer device a composition as defined in claim 1.

54. A method according to claim 53 wherein said heat transfer device comprises a refrigeration device.

55. A method according to claim 54, wherein said heat transfer devices comprises an air conditioning system.

56. A method for reducing environmental impact arising from operation of a product comprising an existing compound or composition, said method comprising a step of replacing at least partially said existing compound or composition with a composition as defined in claim 1.

57. A method according to claim 56 wherein said product is selected from a group consisting of a heat transfer device, a blowing agent, a foamable composition, a sprayable composition, a solvent, and a mechanical power generation device.

58. A method according to claim 57, wherein said product comprises a heat transfer device.

59. A method for preparing a heat transfer device containing R-134a, said method comprising the step of:
introducing a composition according to claim 1 into said heat transfer device.

60. A method according to claim 59, said method further comprising a step of introducing into said heat transfer device a component selected from a group consisting of R-125, a lubricant, a stabiliser and a flame retardant.

61. A method according to claim 60, further comprising a step of removing at least some of said R-134a from said heat transfer device before either introducing step.

62. A method according to claim 59, further comprising a step of removing at least some of said R-134a from said heat transfer device before said introducing step.

63. A composition according to claim 13, wherein said composition has a GWP of less than 500.

64. A method according to claim 3, said method further comprising a step of a use of said composition as defined in claim 1 that results in a lower Total Equivalent Warming Impact, and/or a lower Life-Cycle Carbon Production than is attained by an at least substantially similar use of said existing compound or composition.

65. A method according to claim 3, wherein said replacing step is carried out on a product from a field selected from a group consisting of air-conditioning, refrigeration, heat transfer, blowing agents, aerosols or sprayable propellants, gaseous dielectrics, cryosurgery, veterinary procedures, dental procedures, fire extinguishing, flame suppression, solvents, cleaners, air horns, pellet guns, topical anesthetics, and expansion applications.

66. A method according to claim 65 wherein said product is selected from a group consisting of a heat transfer device, a blowing agent, a foamable composition, a sprayable composition, a solvent, and a mechanical power generation device.

67. A method according to claim 66, wherein said product comprises a heat transfer device.

* * * * *